United States Patent
Staelin et al.

(10) Patent No.: US 9,026,748 B2
(45) Date of Patent: May 5, 2015

(54) CONCURRENT REQUEST SCHEDULING

(75) Inventors: Carl Staelin, Haifa (IL); Gidi Amir, Ness Ziona (IL); Ram Dagan, Modiin (IL); David Ben Ovadia, Tel-Aviv (IL); Michael Melamed, Tel-Aviv (IL); David Edward Staas, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 135 days.

(21) Appl. No.: 13/977,903

(22) PCT Filed: Jan. 11, 2011

(86) PCT No.: PCT/US2011/020788
§ 371 (c)(1),
(2), (4) Date: Jul. 1, 2013

(87) PCT Pub. No.: WO2012/096652
PCT Pub. Date: Jul. 19, 2012

(65) Prior Publication Data
US 2013/0290656 A1    Oct. 31, 2013

(51) Int. Cl.
*G06F 12/00* (2006.01)
*G06F 13/18* (2006.01)
*G06F 13/16* (2006.01)
*G06F 9/50* (2006.01)
*G06F 3/06* (2006.01)

(52) U.S. Cl.
CPC ............ *G06F 13/18* (2013.01); *G06F 13/1663* (2013.01); *G06F 9/5083* (2013.01); *G06F 3/061* (2013.01); *G06F 3/0659* (2013.01); *G06F 3/0676* (2013.01)

(58) Field of Classification Search
CPC .... G06F 13/1663; G06F 13/18; G06F 9/5083
See application file for complete search history.

(56) References Cited

U.S. PATENT DOCUMENTS

| 6,442,648 | B1 | 8/2002 | Genduso |
| 2003/0079080 | A1 | 4/2003 | Demoney |
| 2004/0205166 | A1 | 10/2004 | Demoney |

(Continued)

FOREIGN PATENT DOCUMENTS

WO    WO2010141016    12/2010

OTHER PUBLICATIONS

The International Search Report and the Written Opinion of the International Searching Authority dated Sep. 29, 2011; PCT Application No. PCT/US2011/020788, Filed Jan. 11, 2011.

(Continued)

*Primary Examiner* — Shawn X Gu

(57) ABSTRACT

A method of storage access scheduling for a memory device for a workload of different priority access requests including access requests having a real-time priority. The method includes characterizing the memory device including determining a balanced number (N) of concurrent access requests associated with a concurrent access maximum throughput associated with the memory device. The method also includes characterizing the workload. The method also includes receiving a real-time access request associated with an access request storage location value. The method also includes processing the real-time access request, utilizing a processor, based on the access request storage location value and the values obtained from characterizing the memory device and the workload.

15 Claims, 16 Drawing Sheets

(56) References Cited

U.S. PATENT DOCUMENTS

| | | |
|---|---|---|
| 2006/0062555 A1 | 3/2006 | Zimmerman |
| 2007/0067595 A1 | 3/2007 | Ghose |
| 2009/0100433 A1 | 4/2009 | Kang |

OTHER PUBLICATIONS

Sariowan, H., Cruz, R., and Polyzos, G. Scheduling for quality of service guarantees via service curves. In Computer Communications and Networks, 1995. Proceedings., Fourth International Conference on (1995), pp. 512-520.

Parekh, A., and Gallager, R. A generalized processor sharing approach to flow control in integrated services networks: the single-node case. Networking, IEEE/ACM Transactions on 1, 3 (1993), 344-357.

Gulati, A., Merchant, A., and Varman, P. J. pClock: an arrival curve based approach for QoS guarantees in shared storage systems. In Proceedings of the 2007 ACM SIGMETRICS international conference on Measurement and modeling of computer systems (San Diego, California, USA, 2007), ACM, pp. 13-24.

Rixner, S.etal., Memory access scheduling, In: the 27th Internationa Symposium on Computer Artichitecture. 2000, pp. 128-138. (Rixner, S. et al.).

Staelin, C. et. a l., Rea l-t ime disk scheduling algorithm all owing concurrent I/O requests, HP Laboratories, Oct. 21, 2009, http://www.hpl.hp.com/techre ports/2009/HPL-2009-344.pdf (Staelin, C. et. al) See Page 1,5-6.

1500

```
┌─────────────────────────────────────────────────┐
│         Characterizing a memory device by       │
│                                                 │
│   a balanced number (N) of concurrent access    │
│   requests,                                     │
│   a worst case device service latency value     │
│   (delta) &                                     │
│   maximum worst case throughput rate time       │
│   (1/IOPS) values (tau)                         │
│                       1502                      │
└─────────────────────────────────────────────────┘
                         │
                         ▼
┌─────────────────────────────────────────────────┐
│            Characterizing a workload by         │
│                                                 │
│     a minimum initial slack time value          │
│     (lambda),                                   │
│     a burstiness value (sigma) &                │
│     a worst case queue delay value (zeta)       │
│                       1504                      │
└─────────────────────────────────────────────────┘
                         │
                         ▼
┌─────────────────────────────────────────────────┐
│       Receiving a real-time access request with │
│       an access request storage location value  │
│                       1506                      │
└─────────────────────────────────────────────────┘
                         │
                         ▼
┌─────────────────────────────────────────────────┐
│   Processing the real-time access request,      │
│   based on                                      │
│   the access request storage location value &   │
│   the parameters obtained characterizing the    │
│   memory device and the workload                │
│                       1508                      │
└─────────────────────────────────────────────────┘
```

FIG. 15

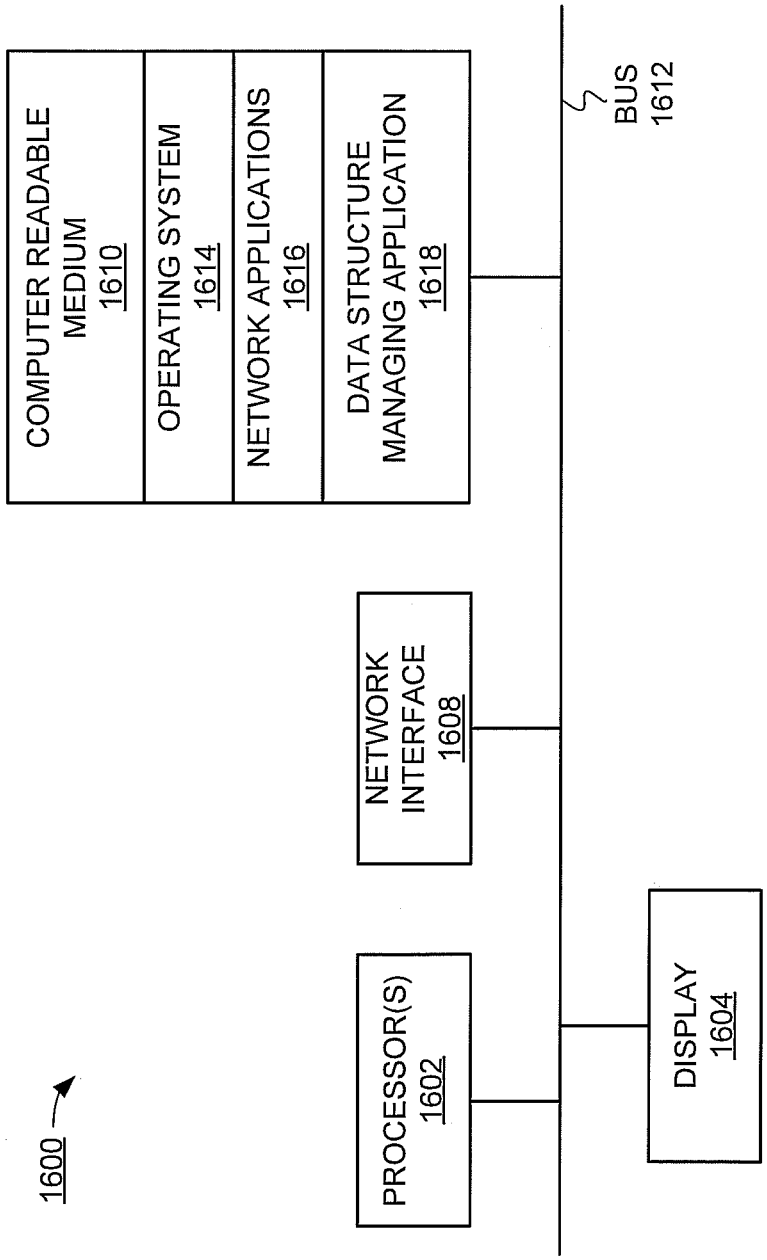

CONCURRENT REQUEST SCHEDULING

BACKGROUND

A disk scheduler manages a queue of pending disk access requests for input/output (I/O) data, deciding at which time and in which order to submit the requests to a storage device. Typically, access requests arrive at a processor in an ongoing stream from a plurality of applications. The access requests are typically addressed to logical blocks associated with storage locations in the storage device. Optionally, disk access requests contain a priority value. Disk access requests often also contain a deadline, which specifies a time by which the disk access request is to have completed processing.

Schedulers often try to minimize average total service time and maximize total system throughput. Additionally, when there are disk access requests with deadlines, the scheduler also attempts to ensure that all such requests are completed before their deadlines. Total service time is the time it takes from the receipt of an access request at a processor to the completion of data transfer in or out of the storage device. Total system throughput is associated with an average transfer rate of data in or out of the storage device. Total service time is a function of the time the request spends waiting in the queue at the scheduler. Total service time is also a function of the device mechanics, which include the seek and rotation distance separating the I/O head and the disk location associated with the block assigned to the I/O data. Total service time also includes the time to transfer the data in or out of the disk.

Schedulers often attempt to minimize the total service times for a group of requests by organizing the requests according to block location to minimize the seek and rotational delays between servicing blocks in the group of requests. A simplified scheduler often organizes the blocks according to an increasing sequence by logical block location. A simplified processing environment often only involves access requests having the same level of priority. However, disk access requests can have different priorities. One common type of priority is a background type request with little or no priority assigned to it. These are often combined in a scheduler with requests having a higher level of priority, such as best effort priority requests. When the different priority types are processed concurrently, overall throughput performance for a storage device may suffer if the scheduler does not send lower priority requests to the storage device while higher priority requests are still processing on the storage device. This type of circumstance often results in a dramatic negative impact on system throughput.

Real-time access requests have a higher priority than either best effort or background priority requests. Concurrently processing real-time requests with lower level priority requests is especially burdensome in some environments. The potential for complications, such as starvation, is even more acute because real-time disk access requests are usually associated with some level of guaranteed near immediate access for I/O data. In attempting to meet these guarantees, a scheduler typically places further limits upon total system efficiency and throughput. Furthermore, not meeting, or missing guaranteed access deadlines is another type of difficulty associated with scheduling real-time access requests. All of these difficulties are associated with scheduling real-time access requests. These difficulties are often compounded when scheduling real-time access requests as part of a mixture of real-time and lower priority requests.

BRIEF DESCRIPTION OF THE DRAWINGS

Features of the present disclosure will become apparent to those skilled in the art from the following description with reference to the figures, in which:

FIG. 15 is a flowchart illustrating a more detailed scheduling method than the scheduling method depicted in FIG. 14, according to an example of the present disclosure; and FIG. 16 is a block diagram illustrating a computer system to provide a hardware platform for the scheduling apparatus shown in FIG. 1, according to an example of the present disclosure.

DETAILED DESCRIPTION

Figure 1:
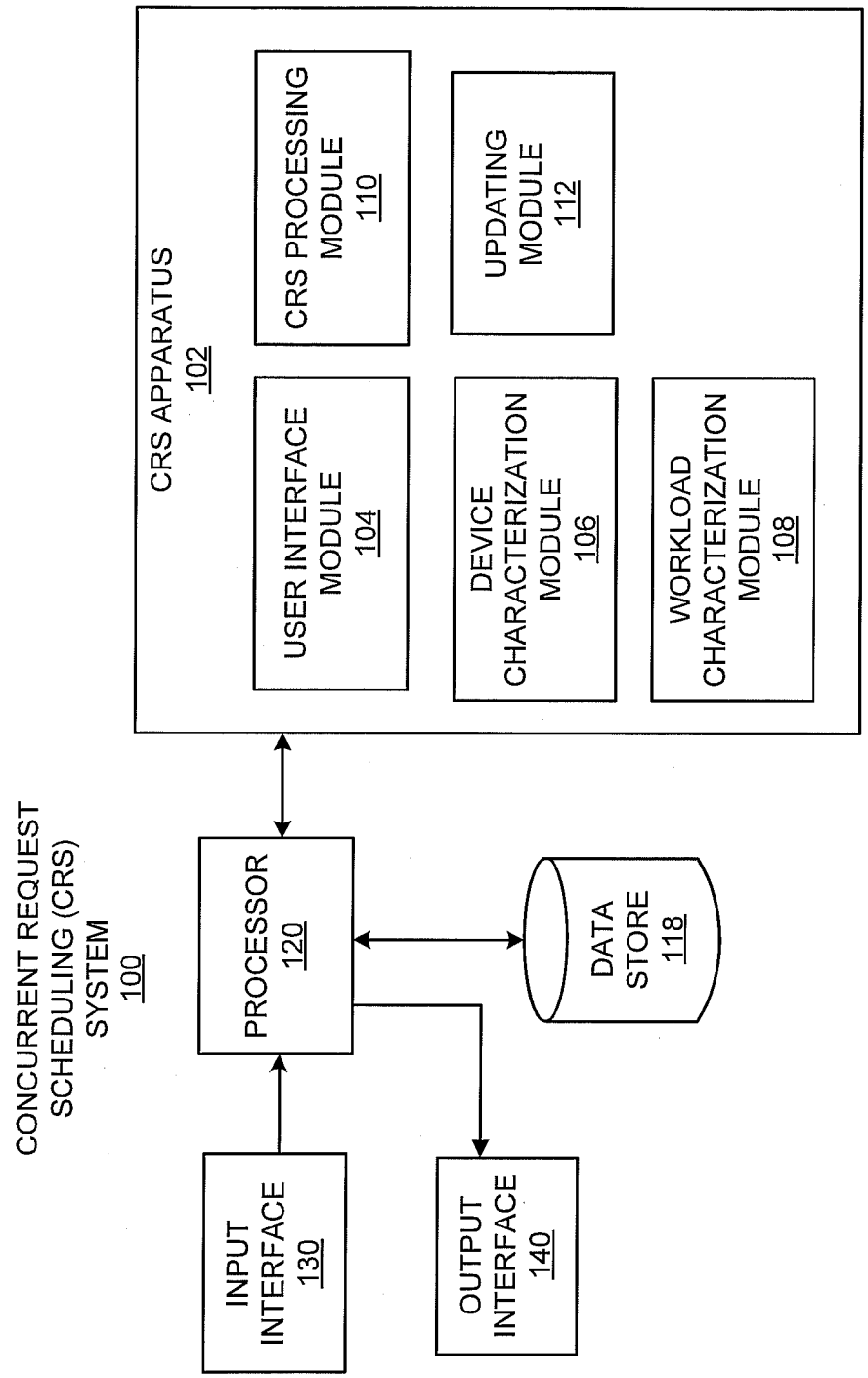
FIG. 1 is a block diagram illustrating a scheduling apparatus, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures are not described in detail so as not to unnecessarily obscure the description of the present disclosure. In other instances, some methods and structures have not been described in detail so as not to unnecessarily obscure the present disclosure. As used herein, the term "includes" means includes but not limited to, the term "including" means including but not limited to. The term "based on" means based at least in part on.

1. OVERVIEW

Disclosed are a method, apparatus and computer-readable medium for storage access scheduling for a memory device having a workload of different priority access requests including real-time access requests. The present disclosure addresses the difficulties associated with successfully meeting guaranteed access total worst-case service times for real-time access requests in the mixed workload, while also maintaining a high level of throughput performance for the memory device.

The present disclosure provides throughput that is substantially optimal across a wide range of operating conditions. The present disclosure utilizes at least one parameter characterizing a memory device and a workload associated with the memory device. The data describing these parameters may be dynamically updated during operation. From a computational standpoint, machine readable instructions are very efficient and may be implemented using O(log(n)) type machine readable instructions, in which n is the size of the queue in terms of requests. The machine readable instructions are relatively simple and may be implemented using very few lines of code, thus making verification of an implementation less complex.

2. DEFINITIONS

The term "access request", as used herein, is a digital instruction directed to a storage device for retrieving or providing IO data associated with the storage device. The memory address of the data may be part of the instruction itself. When a processor decodes the instruction, it obtains the memory address from where it can be read/store the required information. As used herein, the term "access request" is used interchangeably with the term "request".

The term "balanced number (N) of concurrent access requests", as used herein, is a parameter characterizing a memory device. The balanced number (N) of concurrent access requests may be derived by plotting total outstanding I/Os against throughput for the device. As described in greater detail below, with respect to FIG. 3, the knee area in the derived plot is the balanced number (N) of concurrent access requests. The determination finds the point N with the maximum throughput performance having an acceptable worst-case service time. This generally occurs at the knee of the curve where throughput performance as a function of N flattens out.

The term "burstiness value", as used herein, is a value such as a count or time period associated with the burstiness of the real-time requests in a workload.

The term "concurrent access maximum throughput", as used herein, is the throughput associated for a balanced number (N) of concurrent access requests at an average request size.

The term "machine-readable instruction set (MRIS)", as used herein, is a set of digital instructions which may be read by a machine, such as an algorithm, a program, code, software, and the like.

The term "maximum worst-case throughput rate time (1/IOPS) values", as used herein, are time values associated with processing a balanced number (N) of concurrent access requests through a primary queue. The values associated with tau are a function which may at least be associated with values for read/write, random/sequential and request size and, optionally, other values. Also see throughput rate time as defined below.

The term "memory device", as used herein, is a piece of computer equipment, such as a storage device, magnetic tape, disk, etc., or any combination of related pieces of computer equipment in or on which data and instructions can be stored, usually in binary form.

The term "minimum initial slack time value (lambda)", as used herein, is a time value associated with total processing time to pass a real-time access request, in a CRS architecture, through a pending queue for real-time access requests, a primary queue and a black-box device queue.

The term "pending queue", as used herein, is a queue holding access requests which have been added to the pending queue based on some aspect associated with the added access requests, such as an access priority level. The access requests in the pending queue are waiting in the pending queue to be assigned to another queue, such as a primary queue, before they are to be processed for I/O access to a storage location associated with a storage device.

The term "primary queue", as used herein, is a queue holding access requests which have been added to the primary queue as having been granted direct access to a storage device and are waiting in the primary queue to be assigned and processed through an internal black-box queue associated with the memory device for I/O access to a storage location associated with the memory device.

The term "real-time priority", as used herein, is high priority assigned to a real-time access request associated with a deadline for processing the real-time access request for servicing in a memory device.

The term "SCAN", as used herein, is a machine readable instruction set (MRIS), also referred to as an MRIS, for scheduling multiple accesses to a disk. A number of requests are ordered according to the data's position on the storage device. This reduces the disk arm movement to one scan or sweep across the whole disk in the worst case. The service time can be estimated from the disk's track-to-track seek time, maximum seek time (one scan), and maximum rotational latency.

The term "storage location value", as used herein, is a logical address or other location determinant identifying where data may be stored on a disk in a memory device.

The term "throughput rate time", as used herein, is the average time between request completions, which may be defined as the inverse of the IOPS (I/O per second). Throughput rate time is utilized instead of the average service time of a request because of the concurrency of the architecture. Using throughput rate time as the expected resource requirement for a request allows simpler and more accurate accounting, via summation, for storage device or memory device utilization.

The term "total worst-case service access time", as used herein, is the longest period of time that may elapse before a real-time access request must be serviced in a memory device before missing its real-time service deadline.

The term "worst-case device service latency value (delta)", as used herein, is a time value associated with the total service time in a black box arrangement associated with a memory device including an internal black-box queue in the memory device.

The term "worst-case queue delay value (zeta)", as used herein, is a time value associated with processing a request through a primary queue in a CRS architecture. Zeta is not a characteristic of a workload, per se, but is a parameter derived with respect to a CRS architecture, such as CRS architecture 200.

3. CRS ARCHITECTURE

Figure 2:
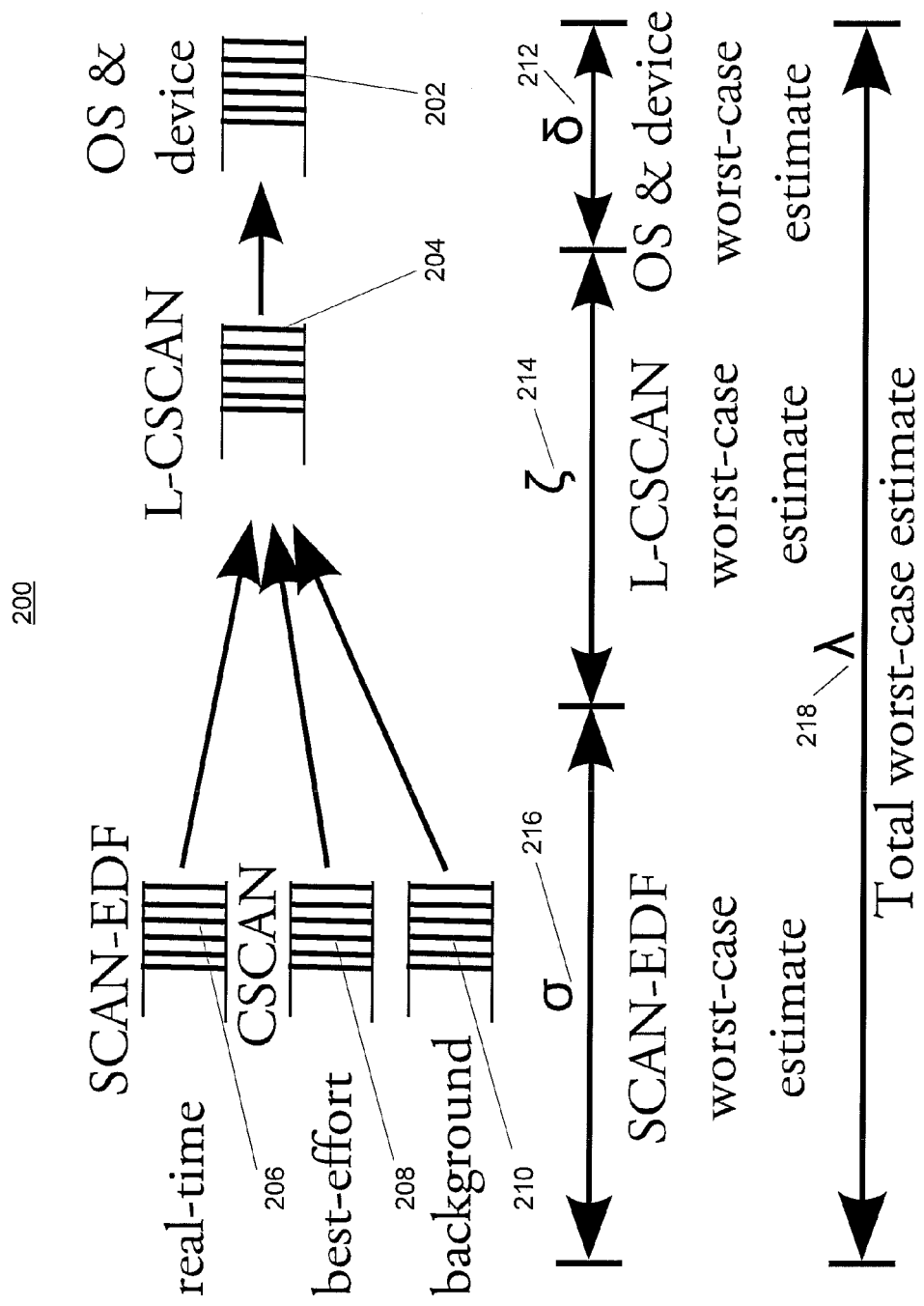
FIG. 2 is an architecture diagram illustrating a scheduling architecture operable with the scheduling apparatus shown in FIG. 1, according to an example of the present disclosure.

Referring to FIG. 1, there is shown a simplified block diagram of an demonstrative example Concurrent Request Scheduling (CRS) system 100, for implementing a CRS architecture, such as a CRS architecture 200 shown in FIG. 2. The CRS system 100 is explained in greater detail below. In the CRS architecture 200, according to an example, there are a plurality of queues, 202 to 210, which are interrelated according to function and priority level. As is explained in greater detail below, the parameters may also be associated with the queues, 202 to 210, in the CRS architecture 200.

CRS architecture 200 includes a conventional internal black-box queue 202 immediately preceding a memory device and its operating system. Preceding the black-box queue 202, there is a primary queue 204. In this example, the primary queue 204 utilizes a machine readable instruction set (MRIS) for scheduling labeled as L-CSCAN. As described in greater detail below, L-CSCAN, which also called Limited CSCAN or LCSCAN, is a variant of the known MRIS entitled Cyclical SCAN (CSCAN).

L-CSCAN manages the primary queue 204 whose size is bounded to provide worst-case queuing delay guarantees. Primary queue 204 may contain access requests having different priority levels including real-time, best-effort, and background priority level access requests. These different priority requests are sorted in the primary queue 204 for optimized performance.

In FIG. 2, to the left of the primary queue 204, there is a pending queue 206 for the real-time requests. In this example, pending queue 206 utilizes an MRIS entitled SCAN-EDF (i.e., SCAN-Earliest Deadline First) for managing the real-time priority requests which are waiting to be admitted to the primary queue 202. Also in CRS architecture 200 are a pending queue 208 for best effort priority requests managed by an MRIS labeled as CSCAN for the MRIS utilized. Background requests which may or may not yet be admitted to the primary queue 204 are held in pending queue 210, according to this example.

In an alternative architecture, other than CRS architecture 200, without real-time requests, the alternative architecture may simply be a CSCAN queue which feeds into a memory device, keeping a constant pool of concurrent requests at the device. There are difficulties in modifying or extend this type of alternative architecture to provide real-time guarantees. First, a worst-case queue delay for a CSCAN queue is usually about twice the CSCAN queue length, so the length of the CSCAN queue should be limited. This is so that the worst-case queue delay is generally less than the minimal initial slack time less the worst-case latency in the memory device. However, worst-case behavior of CSCAN is essentially unbounded. To avoid this type of unbounded worst-case behavior, the CRS architecture 200 uses a variant of CSCAN, L-CSCAN, described in more detail below. Second, once a CSCAN queue size is limited, there may be pending queues before the limited CSCAN queue to absorb excess requests which cannot yet be sent to the CSCAN queue. CRS architecture 200 uses L-CSCAN for real-time requests and other priority requests. So the pending queue 206 for real-time requests utilizes SCAN-EDF as an efficient, deadline-sensitive MRIS to manage pending queue 206 holding only real-time requests. A pending queue for non-real-time requests may be efficient. So according to this example, the CRS architecture 200 utilizes a CSCAN pending queue 208 holding requests having a best-effort priority. Third, for real-time requests, the size of the CSCAN queue 208 may be reduced to account for the maximum time that a real-time request may spend in the SCAN-EDF queue 206. This reduction in size of the SCAN-EDF queue 206 may be a function of the burstiness of the request stream.

The CRS architecture 200 may be modified according to various other examples. For example, the CRS architecture 200 may be modified to replace the single best-effort CSCAN queue 208 with a Fahhradlike queuing system to ensure fairness of best-effort request streams across multiple devices. L-CSCAN is based on CSCAN because of its fairness properties and because it interacts well with lower level schedulers yielding nearly optimal overall system performance. However, other scheduling MRIS programs may be utilized in the CRS architecture 200 to manage the primary queue 204 as long as the worst-case queue delay is guaranteed or the request deadlines are met. Once these limits are reached, new requests are scheduled for the next scan regardless of their location on a disk being scanned in a memory device.

FIG. 2 also demonstrates how to calculate and control the worst-case behavior of the queues 202-210 in the CRS architecture 200 to ensure that real-time deadlines are met. Since the CRS architecture 200 is designed as a pipeline of connected queues, each queue of the pipeline may be considered independently: SCAN-EDF queue 206, L-CSCAN primary queue 204, and OS & device queue 202. In the CRS architecture 200 the combination of any internal OS scheduler, any internal RAID controller and any internal storage device scheduler are all treated as a single black-box device associated with the black-box queue 202.

According to an example, the first approach to providing real-time guarantees in the CRS architecture 200 is to characterize the performance of the memory device at queue 202. Characterizing the performance of the memory device may include a model for predicting the worst-case latency and worst-case throughput rate time for the memory device based on experimental data. The worst-case throughput rate time may be defined as the inverse of the worst-case IO operations per second when processing requests of a given size at a given concurrency level.

One element in characterizing the memory device involves the primary queue 204, shown in FIG. 2 as L-CSCAN queue 204. The L-CSCAN MRIS may be designed so that the worst-case L-CSCAN queue wait time (zeta) 214 is a function of the primary queue 204 length. Then the next consideration is determining the worst-case device completion time for a given L-CSCAN primary queue 204 length. Since a goal of the CRS architecture 200 is to ensure that all real-time requests enter the L-CSCAN queue 204 in time to meet their deadlines, the CRS architecture 200 should allow extra time in the time budget for requests currently in the L-CSCAN queue 204 to drain to make room for real-time requests within a budget time.

In other words, the total worst-case estimate time (lambda) 218 may include three time budget items demonstrated in FIG. 2: worst-case time in the memory device (delta) 212, worst-case time waiting inside the L-CSCAN queue (zeta)

214, and worst-case time waiting inside the SCAN-EDF queue (sigma) 216 waiting to enter the L-CSCAN queue 204.

Since the worst-case wait time (delta) 212 in the memory device may be fixed, or a given, then the control point may be the size of the L-CSCAN queue 204. This may then govern the worst-case time in the L-CSCAN queue (zeta) 214. Therefore, the maximum size L-CSCAN queue 204 may control the time budget available for a real-time request in the SCAN-EDF queue 206 waiting to enter the L-CSCAN queue 204, (i.e., worst-case estimate (sigma) 216). The worst-case time in the L-CSCAN queue (zeta) 214 may be a function of the number of requests in the primary queue 204 and/or the rate at which those requests are managed by the L-CSCAN MRIS.

The burstiness or variability of the real-time workload in the CRS architecture 200 may impact the total worst-case estimate (lambda) 218 time budget allocation to sigma 216. One approach may be to measure the burstiness, and another approach may be to have an application generating requests to declare its burstiness. Similar to the time spent in the L-CSCAN queue (zeta) 214, the time a real-time request spends in the SCAN-EDF queue (sigma) 216 may be a function of the length of the SCAN-EDF queue 206 and the worst-case throughput rate.

A purpose of the SCAN-EDF queue 206 is to absorb bursts, and hold the real-time requests until they may be submitted to the L-CSCAN queue 204. This prevents the L-CSCAN queue 204 from growing too large and thus prevents requests waiting in the L-CSCAN queue 204 from starving and missing their deadlines. Using a SCAN-EDF queue 206 ensures that real-time requests are submitted to the L-CSCAN queue 204 according to a deadline. It also reduces the probability that real-time requests which are submitted out of scanning order do not miss their deadlines. An alternative approach may take into account the variability of request sizes. In this approach, a request is defined in terms of its worst-case throughput rate. In this case the LCSCAN wait time (zeta) 214 and SCAN-EDF wait time (sigma) 216 may in turn be defined in terms of time rather than in the number of requests they may hold.

4. MEMORY DEVICE CHARACTERIZATION

In the following examples, the results of various examples are presented. These results were generated on an HP DL360 server with two dual-core Intel processors and 4 GB of RAM running WINDOWS SERVER 2008. The storage array used for the performance testing was built from eight 146 GB 15 k RPM SAS disks, attached on two SCSI cables (four disks on each cable) to an HP P410i storage controller. The storage was configured into a RAID0 array with 128 kB stripes and a total usable size of 1.1 TB. The MRIS used in these examples accessed the devices used directly, rather than using a file system, and utilized threading and asynchronous I/O capabilities to send multiple I/Os to the device at once.

Unless otherwise indicated, the benchmarks used a closed-loop environment with uniform random disk addresses. Usually there were four thousand (4,000) best effort read requests in the queue waiting to be sent to the device, and the device used had sixty (60) concurrent requests. Real-time requests usually had an initial slack time of thirty (30) seconds, and used a uniform random distribution of disk addresses. Their deadlines were uniformly spaced through time to match the desired throughput rate given the request size. New real-time requests were added to the queue when needed to ensure the thirty second initial slack time, regardless of whether or how previous real-time requests had already been serviced. Also, a read-only request stream was used to factor out the performance gains obtained from RAID controller write buffer caches and SCSI disk immediate write reporting.

In order to provide real-time guarantees, according to an example, the memory device must first be characterized. There are a number of parameters that may impact the device performance, such as concurrency, request size, and request sequentiality. Accurately characterizing the memory device may be complicated by the fact that there are potentially several devices interacting together, such as the disk scheduler within the operating system, the disk scheduler and write cache in the RAID controller, and the disk scheduler in the disk itself. The individual devices may constitute the memory device, or any combination of the devices may constitute the memory device. In characterizing the parameters associated with a memory device, the same components of the memory device may be characterized for each parameter characterized.

Once a real-time request has been sent to the memory device by an application, a control which the application may have to ensure that outstanding real-time request completes in time is to starve the intra-device schedulers of alternative requests to service by not admitting further requests to the memory device. It is preferable that the concurrency be maximized at all times or to maximize performance. This means that real-time requests should be submitted to the device far enough in advance so that almost invariably they do complete before at least the worst-case estimate service time. Otherwise the concurrency must be clamped and the device be starved of requests until it completes a real-time request which is in danger of missing its deadline.

Figure 3:
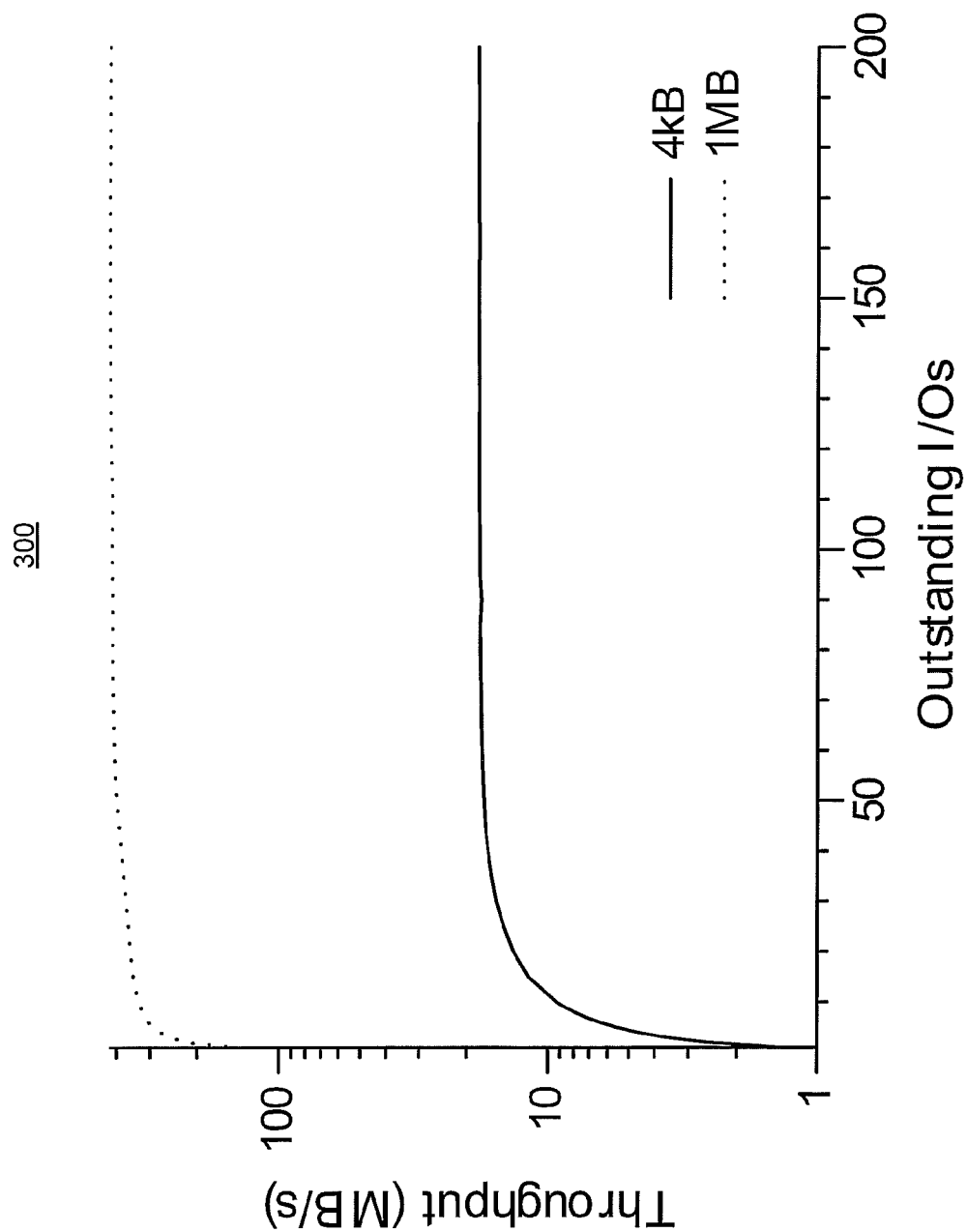
FIG. 3 is a graph demonstrating a determination of a balanced maximum number (N) of concurrent requests for a storage device, according to an example of the present disclosure.

FIG. 3 is a graph 300 which shows throughput as a function of request concurrency at the device for two representative request sizes, 4 kB and 1 MB. The example was completed using a closed-loop system with four thousand (4,000) requests using a uniform random distribution of disk addresses, and passed through a CSCAN queue. As FIG. 3 demonstrates, there is significant performance benefit to using concurrent requests.

FIG. 3 demonstrates a determination of a balanced number (N) of concurrent access requests as a parameter characterizing the memory device. The balanced number (N) of concurrent access requests may be derived using a device characterization module 106 in the CRS apparatus 102 described in greater detail below. The parameter may be derived by plotting total outstanding I/Os against throughput.

As shown in FIG. 3, for the memory device in the example, the benefits associated with concurrency reach a knee in the plotted curve at about sixty (60) concurrent requests. This knee area in the derived plot is the balanced number (N) of concurrent access requests. The determination finds the point N associated with the maximum throughput performance also having an acceptable worst-case service time. Under regular circumstances, this occurs at the knee of the curve where throughput performance as a function of the number of I/Os flattens out. In the determination of the example, as shown in FIG. 3, 60 concurrent requests is consistent for the memory device across a range of request sizes from 4 kB to 1 MB. In the following examples, 60 concurrent access requests is used as the balanced number (N) as the default tested concurrency for the memory device determining other parameters associated with characterizing the memory device.

Figure 4:
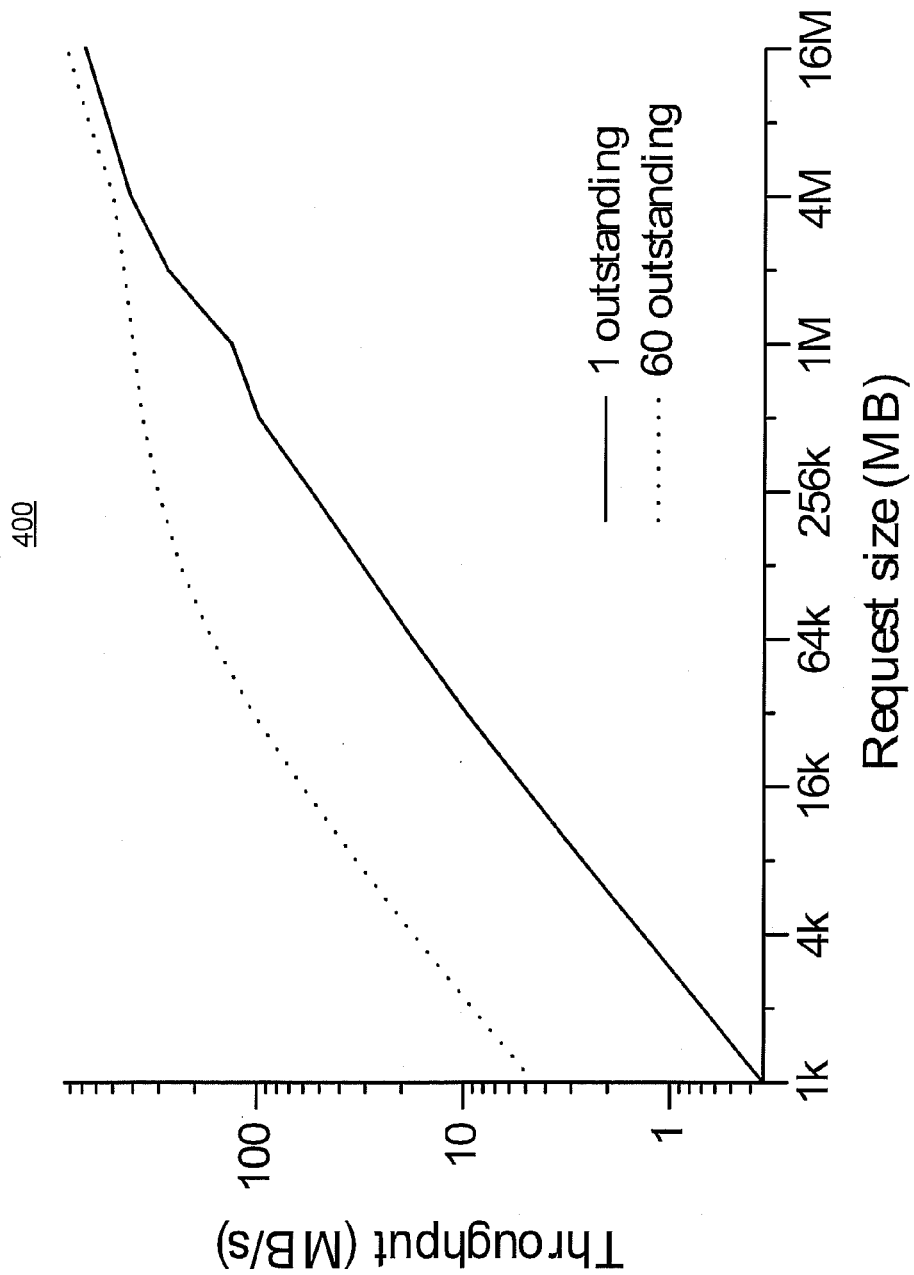
FIG. 4 is a graph demonstrating the effectiveness of determining a substantially optimal maximum number (N) of concurrent requests for a storage device and the throughput of the storage device, according to an example of the present disclosure.

FIG. 4 is a graph 400 which demonstrates total throughput as a function of the request size for the memory device. The data was generated for two curves shown in FIG. 4. One curve shows instances when there is a single request of different sizes at a time at the memory device (i.e., a tested concurrency of 1). The other curve shows instances when there are sixty concurrent requests at a time at the memory device (i.e., a tested concurrency of 60). The two curves demonstrate that the benefits of utilizing the available concurrency are consistently significant across the range of request sizes, from 1 k to 16 MB.

Figure 5:
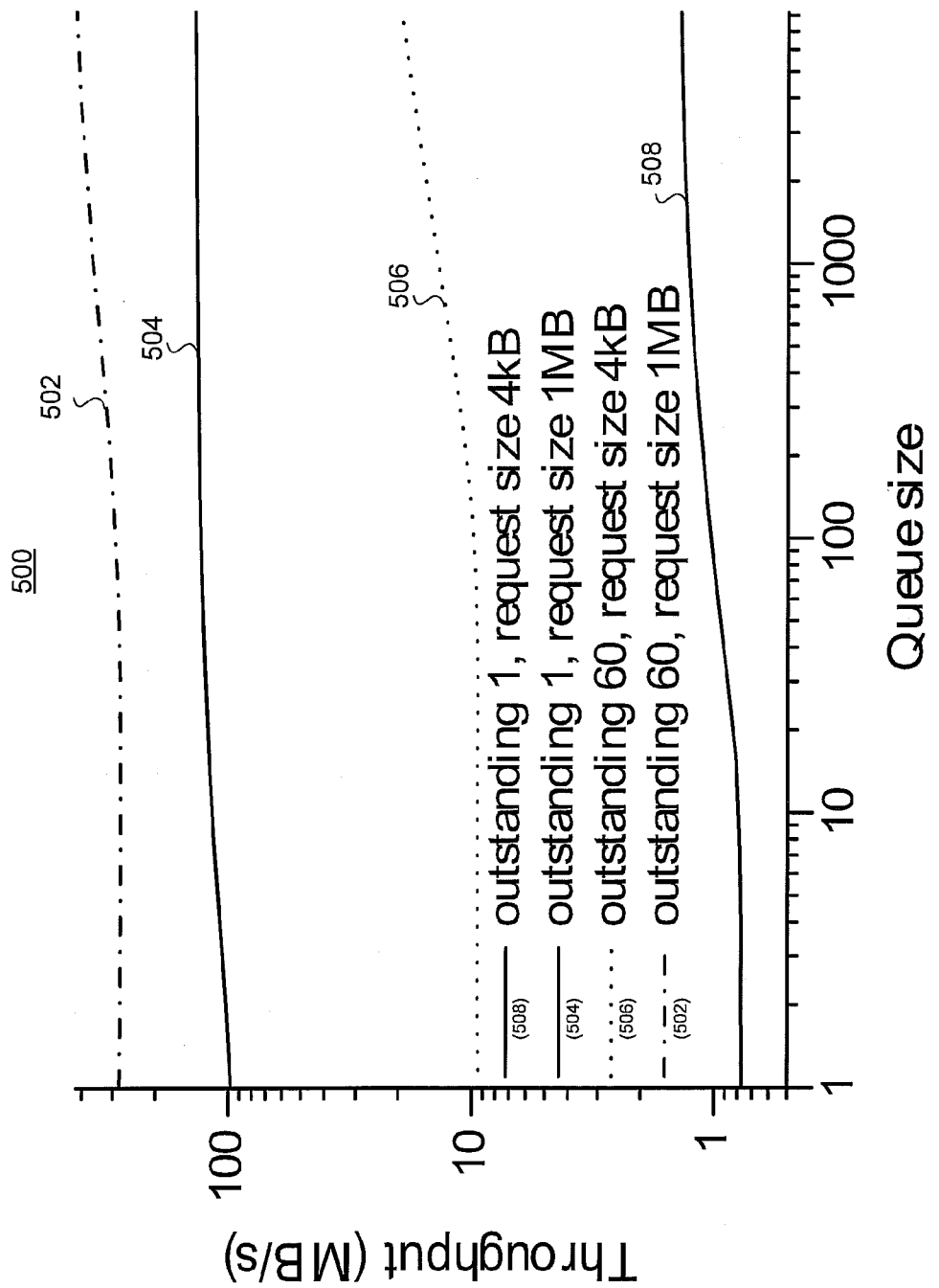
FIG. 5 is a graph demonstrating the relationship between queue size and throughput for a storage device, according to an example of the present disclosure.

FIG. 5 is a graph 500 which demonstrates how throughput performance changes as a function of the size of a CSCAN queue size associated with the memory device tested. The CSCAN queue re-orders the requests to minimize seek time. It also processes requests closer together in time which are spatially adjacent on the device. This generally makes it possible for the intra-disk scheduler, which likely uses a positional-aware scheduling MRIS, to better optimize throughput performance.

The larger a CSCAN queue is, the better it is for the CSCAN queue to cluster requests in space and time. If requests are more tightly clustered when they are sent to the disk, this is better for a rotational positional-aware scheduler to service multiple requests in a single rotation. FIG. 5 shows two curves, 502 and 506, with sixty outstanding requests. Curve 502 has sixty outstanding requests having a request size of 1 MB. Curve 504 has one outstanding request having a request size of 1 MB. Curve 506 has sixty outstanding requests having a request size of 4 kB. Curve 508 has one outstanding request having a request size of 1 kB. As shown in FIG. 5, as the CSCAN queue size increases, so does disk throughput.

When considered together, the results in FIGS. 4 and 5 show that it is important to both maintain concurrency and to maximize CSCAN queue size in order to maximize throughput. As shown with the tested device, throughput increases as a function of concurrency and CSCAN queue size. However, concurrency, up to about sixty requests, is more important than CSCAN queue size. So maximizing concurrency by determining a balanced number (N) of 60 concurrent access requests for a memory device is to be given priority over maximizing CSCAN queue size.

It is also helpful that throughput performance not degrade as workload increases. Otherwise a memory device may enter into a negative feedback cycle in which where increased load may cause degraded performance. Thus may in turn cause further load increases. To avoid this circumstance, the CSCAN MRIS should be able to maximize concurrency, or at least maintain maximal concurrency under load. In this circumstance, and so long as increased load yields increasing or non-decreasing queue sizes, performance does not decrease under increased load.

The results demonstrate that both concurrency and CSCAN scheduling have an impact on throughput performance which is optimized with both high concurrency and large CSCAN queues. However, concurrency has a significantly greater impact for the tested memory device. So if the scheduler must choose between concurrency and CSCAN queue depth, it should preferentially maintain concurrency.

Next, after determining the balanced number (N) of concurrent access requests, other parameters may also be determined to further characterize the memory device. Device characterization also must take into account read vs. write performance. Another device characterization parameter is the device's worst-case latency which may be expressed as a worst-case device service latency value (delta). Another device characterization parameter is the throughput rate time for random and sequential request streams. All of the device characterization parameters derived using the device characterization module 106 in the CRS apparatus 102 described in greater detail below.

For example, if there is the queuing MRIS in the disk itself, which may be an MRIS such as SATF, which may starve requests. Similarly, if there are a balanced number N concurrent requests outstanding at the disk, the device characterization module 106 in the CRS apparatus 102 may be utilized to derive the worst-case service time for those requests. The device characterization module 106 in the CRS apparatus 102 may derive the worst-case latency with full concurrency, across a spectrum of request sizes, and across the range of CSCAN queue sizes, and choose the maximal value.

Figure 6:
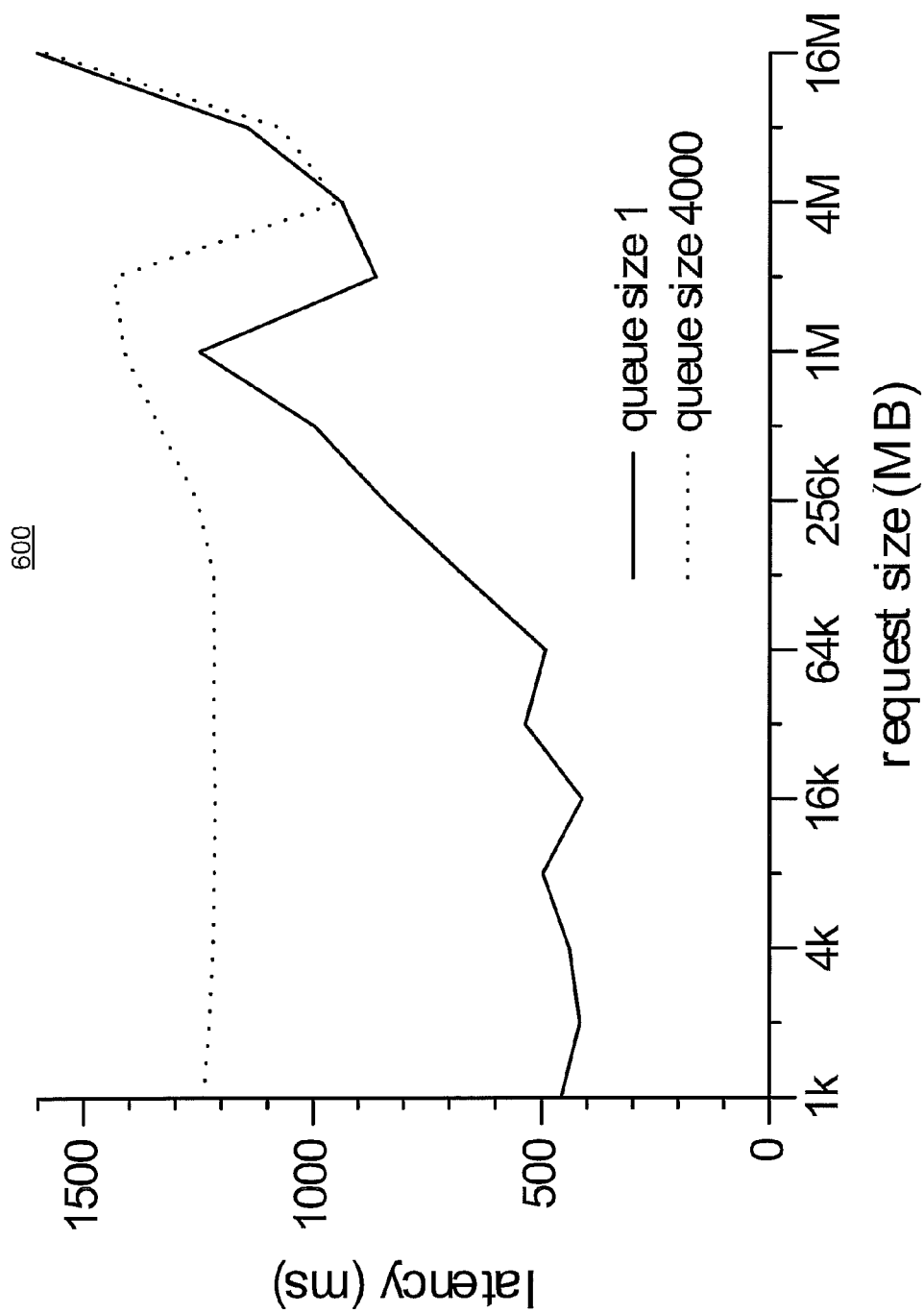
FIG. 6 is a graph demonstrating the relationship between worst-case latency and request size for a memory device, according to an example of the present disclosure.

FIG. 6 is a graph 600 which shows a worst-case latency as a function of request size, with a purely random request stream for sixty outstanding requests, with both a large 4,000 request CSCAN queue before the disk, and without any queue before the disk. The worst-case time is shorter when the requests are given in random order (CSCAN queue length 1). The worst-case service time for 60 outstanding requests and a CSCAN queue of 4,000 requests is relatively stable at about 1,100 ms across the range of request sizes, suggesting that the lower-level scheduler has some sort of anti-starvation parameter with a threshold or aging parameter set to about that value. Since worst-case performance is generally much worse for larger CSCAN queue sizes, and since worst-case latency is relatively stable across request sizes, approximating the worst-case latency by the maximal value at a 16 MB request size for both queue sizes, at about 1.6 seconds, is a reasonable estimate of the worst-case latency.

The worst-case throughput is measured using conditions similar to those in FIG. 3, except with an empty CSCAN queue so that the device is presented with a uniform random request stream. A configuration file holding the device characterization parameters derived using the device characterization module 106 in the CRS apparatus 102 may store the worst-case latency with full concurrency and the worst-case throughput as a function of request size.

Figure 7:
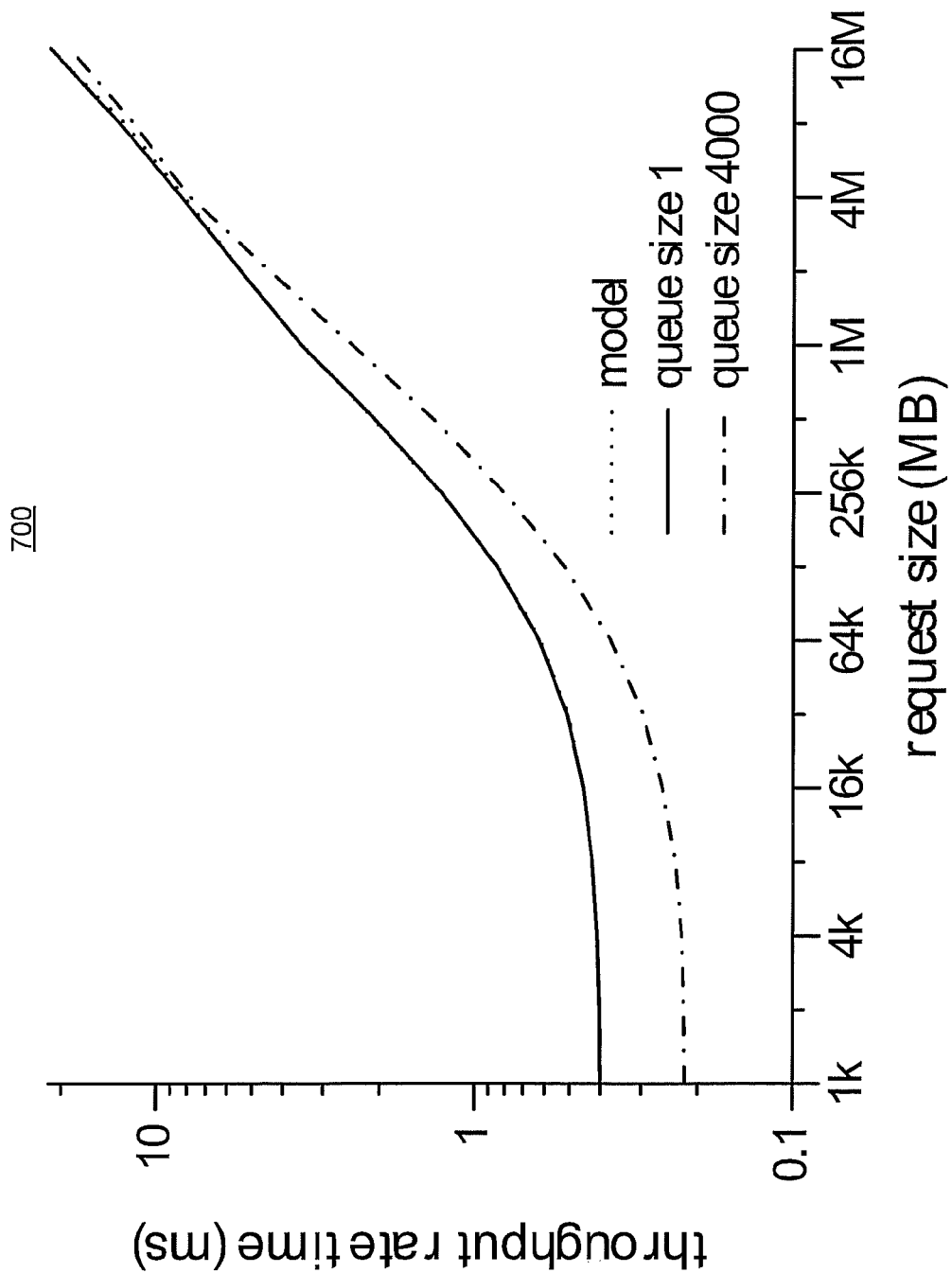
FIG. 7 is a graph demonstrating the determination of throughput rate time as a function of average request size for random requests, according to an example of the present disclosure.

FIG. 7 is a graph 700 which shows the throughput rate time as a function of request size for random request streams, with a CSCAN queue size 1, and with sixty (60) concurrent requests at the device. The worst-case throughput rate time is for CSCAN queue size 1, because the request stream as submitted to the device is maximally randomized.

For comparison, FIG. 7 also shows the throughput rate time when the CSCAN queue has 4,000 requests, and demonstrates that a CRS architecture performs much better, especially for smaller requests, if seek and rotational delay overheads dominate the total transfer costs.

Figure 8:
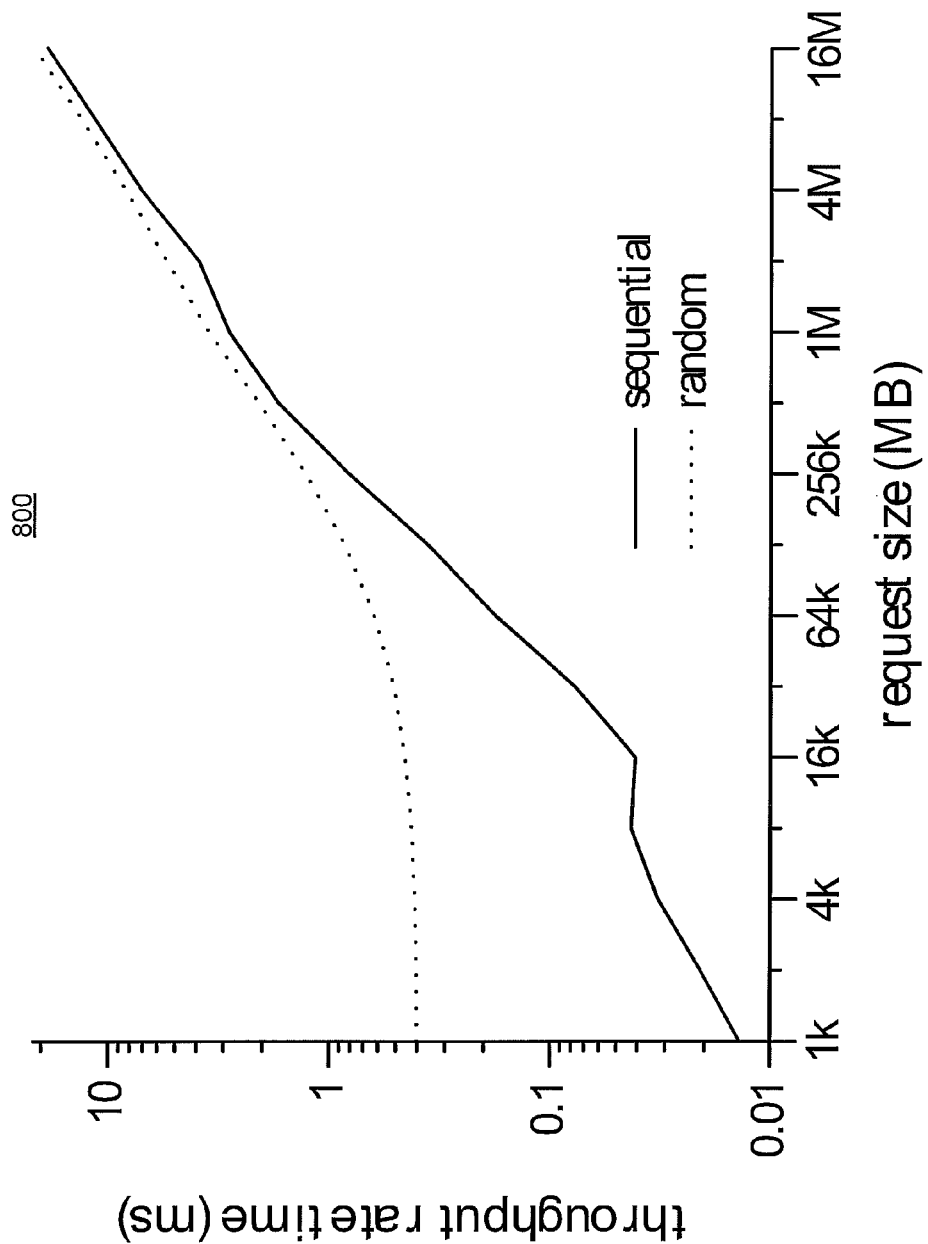
FIG. 8 is a graph demonstrating the determination of a worst-case throughput rate time as a function of average request size for random requests and as a function of sequential requests, according to an example of the present disclosure.

FIG. 8 is a graph 800 which is similar to FIG. 7 described above, except that FIG. 8 shows a worst-case throughput rate time for both sequential and random request streams as a function of request size. As shown in FIG. 8, the worst-case throughput rate times are smaller than for the random request stream case. For small request sizes the rate times are significantly smaller than for the random request streams.

In determining the expected throughput rate time value for a given request, the device characterization module 106 in the CRS apparatus 102, the IOs-per-second are obtained by dividing the throughput in MB/s by the request size when the device has full concurrency (a balanced N concurrent pending requests), but no queuing in front of the device, so that the random request stream is fully random. The worst-case throughput rate time for random requests is the solid line in FIG. 7 and for sequential requests is the solid line in FIG. 8. So, for 4 KB random requests, the worst-case throughput rate time for the memory device is approximately 0.4 ms as shown in FIG. 7. For 4 kB sequential requests, the worst-case throughput rate time is approximately 0.03 ms as shown in FIG. 8.

5. MRISS MANAGING QUEUES IN A CRS ARCHITECTURE

CSCAN

Cyclical SCAN is a known and efficient disk scheduling MRIS. For random request streams, it has excellent fairness characteristics, and optimal or near optimal performance, especially when used in a layered architecture with a positional-aware scheduling MRIS at the memory device. CSCAN includes two MRISs: Add and Pop, as shown in MRISs 1 and 2, which add a new request to the queue and schedule the next request respectively.

CSCAN is usually implemented as a pair of ordered sets, one labeled as current and one labeled as next. The current set contains those requests whose addresses are greater than the current disk location, while the next set contains those requests whose disk locations are less than the current disk location. There is also the notion of the current disk head location, offset, which sweeps from one end of the disk to the other, before jumping back to the beginning.

| CSCAN MRIS 1. Adding a request to CSCAN |
|---|
| 1: procedure Add(Request r) |
| 2: if r.offset < offset then |
| 3:                 next.insert(r) |
| 4: else |
| 5:                 curr.insert(r) |
| 6: end if |

CSCAN MRIS 1 shows the MRIS for adding a new request to a CSCAN queue. Essentially, if the request's address is smaller than the offset, then the request does need to be serviced in the next scan so it is added to the next set. Otherwise the request's address is greater or equal to the current head location and the request can still be processed in this scan, so it is added to the current set curr. In this example, the current and next sets are implemented using C++ STL set classes which are implemented as binary trees, so the insert, delete, and smallest operations each take O(log(n)) time, which is very efficient. In this example, CSCAN MRIS 1 takes O(log(n)) time.

| CSCAN MRIS 2. Popping a request from CSCAN |
|---|
| 1: procedure Pop( ) |
| 2: if curr.empty( ) then |
| 3:                 Swap(curr, next) |
| 4: end if |
| 5: result ← curr.smallest( ) |
| 6: curr.delete(result) |
| 7: offset ← result.offset |
| 8: return result |

CSCAN MRIS 2 shows an MRIS for choosing the next request to be submitted to the device. First, CSCAN MRIS 2 checks to see if the current scan is done; and if it is, then it swaps the current and next sets to begin the next scan. It then chooses the smallest request in the current scan and does some basic bookkeeping operations: removing the chosen request from the current set and updating the current head location. CSCAN MRIS 2 also takes O(log(n)) time.

It is possible to implement the set data structure so that it merges the two operations curr.smallest( ) and curr.delete( ) into a single operation, or at least that does not require a second traversal of the tree structure, yielding a factor of two performance improvement. With a uniform random access stream and a closed queuing model with N requests, the average worst-case service delay, as measured in request counts, is roughly twice the queue length or 2N. When a new scan is started, the initial curr scan is empty and next contains N requests. After the swap, next is empty and curr has N requests.

LCSCAN

According to an example, as an MRIS to manage primary queue 204, there is implemented a variant MRIS of CSCAN, the Limited CSCAN, or L-CSCAN. The L-SCAN MRIS provides hard guarantees on the worst-case queue delay and avoids behavior that causes starvation in the potentially unlimited duration of a single scan. Since the size of the L-CSCAN queue 204 may be limited, then it is possible to control the length of a single scan with additional tests before adding new requests to the current scan.

| L-CSCAN MRIS 1. Adding a request to Limited CSCAN |
|---|
| 1: procedure Add(Request r) |
| 2: if r.offset < offset OR curr.size( ) < count then |
| 3:                 next.insert(r) |
| 4: else |
| 5: curr.insert(r) |
| 6: count++ |
| 7: end if |

L-CSCAN MRIS 1 is a Limited CSCAN MRIS for adding a new request to the queue. It differs from a standard CSCAN MRIS. The usual test for standard CSCAN at line 2 is if (r.offset<offset). L-CSCAN adds a second clause that limits the number of times requests may be added to the current scan, curr.size( )<count. It is this additional clause which prevents L-CSCAN from starving requests because after count requests have been added to the current scan queue, all new requests are be added to the next queue, regardless of their location.

The count in L-CSCAN MRIS 1 only tracks requests added to the current queue; it ignores all requests added to that queue when it was the next queue before the most recent Swap( ). L-CSCAN MRIS 1, like CSCAN MRIS 9, is very efficient, taking O(log(n)) time.

| L-CSCAN MRIS 2. Popping a request from Limited CSCAN |
|---|
| 1: procedure Pop( ) |
| 2: if curr.empty( ) then |
| 3:                 Swap(curr, next) |
| 4:                 count ← 0 |
| 5: end if |
| 6: result ← curr.smallest( ) |
| 7: curr.delete(result) |
| 8: offset ← result.offset |
| 9: return result |

L-CSCAN MRIS 2 shows the pseudo-code for the Pop( ) MRIS, which differs from that of standard CSCAN only at Line 4, where count is reset when we start a new scan. Again L-CSCAN MRIS 2 is very similar to CSCAN MRIS 2 and has performance O(log(n)).

The above calculations with respect to all the described MRISs are based on the number of requests, not actual service times. If the request stream has uniform request sizes, then the two cases are identical. However, in reality most systems have heterogeneous request streams, and an application may have a wide ranging mix of request sizes. In this case, the worst-case latency may be specified in terms of time, and the above calculations regarding the number of requests that may be added to a current scan are also done in terms of throughput rate time. To do this an MRIS may keep a running tally of the throughput rate time sum for the queue as a whole, and for each scan. It must also keep a sum of the throughput rate time added to the current scan since the most recent Swap.

When switching from a request count basis to a time basis, it may be necessary that the measure be used to decide when to end a scan. This may not be monotonically increasing. For example, to complete a large request and to insert a small request, the expected service time may drop below the scan time threshold. Since requests may be sequential, it may be needed to add a state parameter to the system so once a decision is made, a request which may have been added to the current scan, but wasn't because the expected scan time would exceed the desired bound, then a flag may be set that prevents any other requests from being added to that scan.

This time-based variant of L-CSCAN may use five new state parameters: scan, start, sum_current, sum_next, and closed, and it relies on accurate worst-case throughput rate time estimates for each request. Scan defines the maximum amount of time a single scan may take, start is the time at which the current scan started, sum_current is the sum of the expected throughput rate times for the requests in the current scan, sum_next is the sum of the expected throughput rate times for the requests in the next scan, and closed is a boolean specifying whether new requests may still be added to the current scan.

The worst-case throughput rate time estimate may be derived from the assessment of the memory device described above. This would take into account three characteristics of the request: size, read|write, and sequential, where size is the request size in bytes, read|write specifies whether the request is a read or a write request, and sequential is a boolean that specifies whether the request is sequential or not. In general, sequential may be determined using a simple filter, but in the general case sequential merely states whether there is a pending request in the queue with the same read|write state as the current request that addresses the bytes immediately preceding the start address of the current request.

---

L-CSCAN MRIS 3. Adding a request to time-based Limited CSCAN

---

1: procedure Add(Request r)
2: if r.offset < offset AND scan < (now( ) − start) + sum_current then
3:     closed ← true
4: end if
5: if r.offset < offset OR closed then
6:     next.insert(r)
7:     sum_next ← sum_next + r.expected( )
8: else
9:     curr.insert(r)
10:    sum_current ← sum_current + r.expected( )
11: end if

---

L-CSCAN MRIS 3 shows the Limited CSCAN MRIS when the limits are specified in terms of time. The variable r.expected( ) may be defined as (worst-case) throughput rate time. The primary difference between L-CSCAN MRIS 1 and L-CSCAN MRIS 3 is the replacement of the count-based test with the time-based test, and the fact that the time-based test changes a state variable rather than simply being continually re-tested at each insertion. Again, the running time of L-CSCAN MRIS 3 is O(log(n)).

---

L-CSCAN MRIS 4. Popping a request from time-based Limited CSCAN

---

1: procedure Pop( )
2: if curr.empty( ) then
3:     Swap(curr, next)
4:     start ← now
5:     sumcurrent ← sumnext
6:     sumnext ← 0
7:     closed ← false
8: end if
9: result ← curr.smallest( )
10: curr.delete(result)
11: offset ← result.offset
12: return result

---

The primary difference between L-CSCAN MRIS 2 and L-CSCAN MRIS 4 is the bookkeeping changes to reset the various state variables at the beginning of each scan, so the running time is still O(log(n)).

L-SCAN optimizes disk performance with longer scans. CSCAN yields scans that are as long as possible, and longer in some cases, so as a result its performance is excellent. Known MRISs for scheduling real-time priority requests arbitrarily limit the number of requests that can be bundled into a single scan, which can provide tighter guarantees on worst-case queue delay time. But the scans are generally be much smaller than necessary, which may result in much worse performance than necessary.

CSched

CSched is an MRIS designed to provide optimal, or near optimal, performance, with minimal performance penalty for offering real-time deadline guarantees. CSched may be implemented in a user-level application. It may also be implemented in an operating system, a (RAID) disk controller, or even a storage device or storage service. In addition to an accurate device characterization, it utilizes two configuration parameters: (sigma, lambda), with sigma defined as the maximal burst size in seconds and lambda defined as the minimal initial slack time for real-time requests. The disk characterization and these parameters are then translated into the internal configuration parameters controlling the scheduler.

Note that sigma may be computed using the leaky bucket model except that instead of being specified in terms of requests it is specified in terms of time. Briefly, the leaky bucket model may be described as follows. The arrival function for a request stream, R(s, t) is the total number of I/O requests man in the time interval [s, t]. A request stream is well behaved if R(s, t)≤sigma+rho(t−s) for all time intervals [s, t]. The leaky bucket model is described further in the following references: Parekh, et al. A generalized processor sharing approach to flow control in integrated services networks: the single-node case. Networking, IEEE/ACM Transactions on 1, 3 (1993), 344-357; Sariowan, et al. Scheduling for quality of service guarantees via service curves. In Computer Communications and Networks, 1995. Proceedings, Fourth International Conference on (1995), pp. 512-520; and Gulati, et al., pClock: an arrival curve based approach for QoS guarantees in shared storage systems. In Proceedings of the 2007 ACM SIGMETRICS international conference on Measurement and modeling of computer systems (San Diego, Calif., USA, 2007), ACM, pp. 13-24, each of which are incorporated by reference herein, in their entireties.

The primary internal configuration parameter is the allocation of the available time budget, lambda, between the SCAN-EDF, L-CSCAN, and device queues. Since the device time budget is defined solely by the worst-case service time of the request stream, this is obtained directly from the disk characterization as delta. The next block is to determine the time budget which must be allocated to the SCAN-EDF queue to absorb bursts, and this is simply the time required to process the largest burst, or sigma. The remaining budget is assigned to the L-CSCAN queue. The L-CSCAN queue size, which CSched uses to determine whether the L-CSCAN queue is full or not, is defined in units of time.

MRIS CSched 1 - Configuring a CSched queue

```
1: class CSched
2:          LCSCAN* lcscan
3:          Sched** pending
4:          int nqueues
5:          time t zeta
6: CSched(time t sigma, time t lambda, time t delta)
7:          zeta ← (lambda - sigma - delta) / 4
8:          lcscan ← new LCSCAN(zeta)
9:          pending ← new Sched*[nqueues + 1]
10:         pending[0] ← new SCAN EDF
11:         for i in 1:nqueues do
12:                 pending[i] ← new CSCAN
13:         end for
```

MRIS CSched 1 describes the CSched data structures and shows how the various elements are initialized.

MRIS CSched 2 Adding a request to CSched

```
1: procedure Add(Request r)
2: if lcscan.expected( ) + r.expected( ) < zeta then
3:          {L-CSCAN is not full}
4:          lcscan.Add(r)
5: else if 0 < r.deadline then
6:          {real-time request}
7:          pending[0].Add(r)
8: else
9:          {best-effort or background request}
10:         pending[r.priority].Add(r)
11: end if
```

MRIS CSched 2 shows how requests are added to the CSched queue. Please note that lcscan.expected( ) is computed as lcscan.sumcurrent+lcscan.sumnext, and is the sum of the worst-case throughput rate times for all requests currently held in the lcscan queue. First, if adding the request to the L-CSCAN queue would not cause it to exceed the allowed size (as specified in terms of time), then the request is simply added to the L-CSCAN queue. Otherwise the request is added to the appropriate pending queue, which is SCAN-EDF for real-time requests and CSCAN for best-effort and background requests. Note that this code is general and may use any other scheduling system for these non-real-time requests.

MRIS CSched 3 Popping a request from CSched

```
1: procedure Pop( )
2: result ← lcscan.Pop( )
3: for i = 0 to nqueues do
4:          if pending[i]¬ empty then
5:                  r ← pending[i].Head( )
6:                  if lcscan.expected( ) + r.expected( ) ≥ zeta
                    then
7:                          {L-CSCAN is now full}
8:                          break
9:                  end if
10:                 r ← pending[i].Pop( )
11:                 lcscan.Add(r)
12:         end if
13: end for
14: return result
```

MRIS CSched 3 shows what happens when removing a request from the queue to submit it to the storage device. First the MRIS CSched 3 removes the next request from the L-CSCAN queue in line 2. Since removing a request from the L-CSCAN queue likely means that there is now room to add a request from the pending queues, the system iteratively checks each pending queue, starting with the real-time SCAN-EDF queue, looking for requests. So long as there is room to add requests to the L-CSCAN queue, it does so. As soon as the LCSCAN queue is full or the pending queues are empty, it stops. Note that the test on line 6 is the same as that on line 2 in MRIS CSched 2 above. Also, line 5 merely returns the next request that is to be popped from the queue without actually removing the request. It is roughly equivalent to the line r curr.smallest( ) at line 9 in MRIS CSched 1 above.

Since substantially optimal performance is obtained using concurrency of roughly sixty (60) (see FIG. 3), then the system maintains the maximal concurrency so long as there are any queued requests. Secondly, since performance is improved by having larger CSCAN (or L-CSCAN) queues in front of the device (see FIG. 5), then it is sought to maximize the L-CSCAN queue size. However, it is sought to limit this queue size to ensure that the worst-case queue delay does not exceed the budget.

The Limited CSCAN, L-CSCAN, schedulers role is to: (1) submit requests to the device in an optimal fashion, or near optimal fashion, so that the lower-level location-aware schedulers can better utilize its request reordering capabilities to maximize throughput, and (2) ensure that worst-case scheduling delay is limited so that real-time guarantees may be provided by the solution as a whole.

SCAN-EDF

The SCAN-EDF queue absorbs bursts, to enable limiting the size of the L-SCAN queue to provide the real-time guarantees. A reason for using a SCAN-EDF rather than a FIFO or EDF queue is for potentially improved performance, particularly with bursty workloads. It is also helpful for real-time requests not submitted in order with respect to deadlines. For example, a workload may tend to be very bursty, with new batches of data needed every 130 ms, where a batch may contain as many as thousands of small requests which are submitted to the storage device in random order with respect to the disk address. In this case, using SCAN within each batch means that the requests are sent to the L-CSCAN queue in a partially optimized fashion, so the overall throughput may be maximized.

SCAN-EDF is not limited in size per-se, but assuming the workload was accurately characterized, then according to an example, it does not hold more than sigma requests or be larger than a period of time associated with the requests, and the worst-case queue delay experienced by a request in the SCAN-EDF queue is sigma*expected, where expected is the expected worst-case throughput rate time for the request stream.

CSCAN Schedulers

The CSCAN schedulers hold non-real-time requests until there is space available in the L-CSCAN queue. Requests are passed from these queues in priority order, so for example background requests would only be passed from the background CSCAN queue to the L-CSCAN queue if and only if both the real-time SCAN-EDF and best effort CSCAN queues were empty. It is possible, and potentially useful to utilize alternative architectures, such as that of pClock as disclosed in Gulati, et al., pClock: an arrival curve based approach for QoS guarantees in shared storage systems. In *Proceedings of the* 2007 *ACM SIGMETRICS international conference on Measurement and modeling of computer systems* (San Diego, Calif., USA, 2007), ACM, pp. 13-24, which is incorporated by reference above, in its entirety. In addition, other suitable known architectures may be used to control the submission of requests from various non-real-time streams to the L-CSCAN queue.

6. RESULTS

The CSched MRIS's performance is similar to that of CSCAN, except that CSched has no missed deadlines while CSCAN provides no real-time guarantees. The CSched MRIS's performance is tested under two high workload conditions: uniform random real-time request streams with various workloads with either uniform random or sequential best-effort request streams. Overall performance is minimized when both the real-time and best-effort requests streams are uniform random, while a sequential best-effort request stream provides the most adversarial request stream for CSCAN from a fairness standpoint. Many best-effort workloads are some mixture of uniform random and sequential requests. So actual performance is likely to be intermediate between these two workloads. The application's workload can be characterized by the case with uniform random real-time and best-effort request streams. However, there is usually a mixture of request sizes, rather than a uniform 4 kB size.

Figure 9:
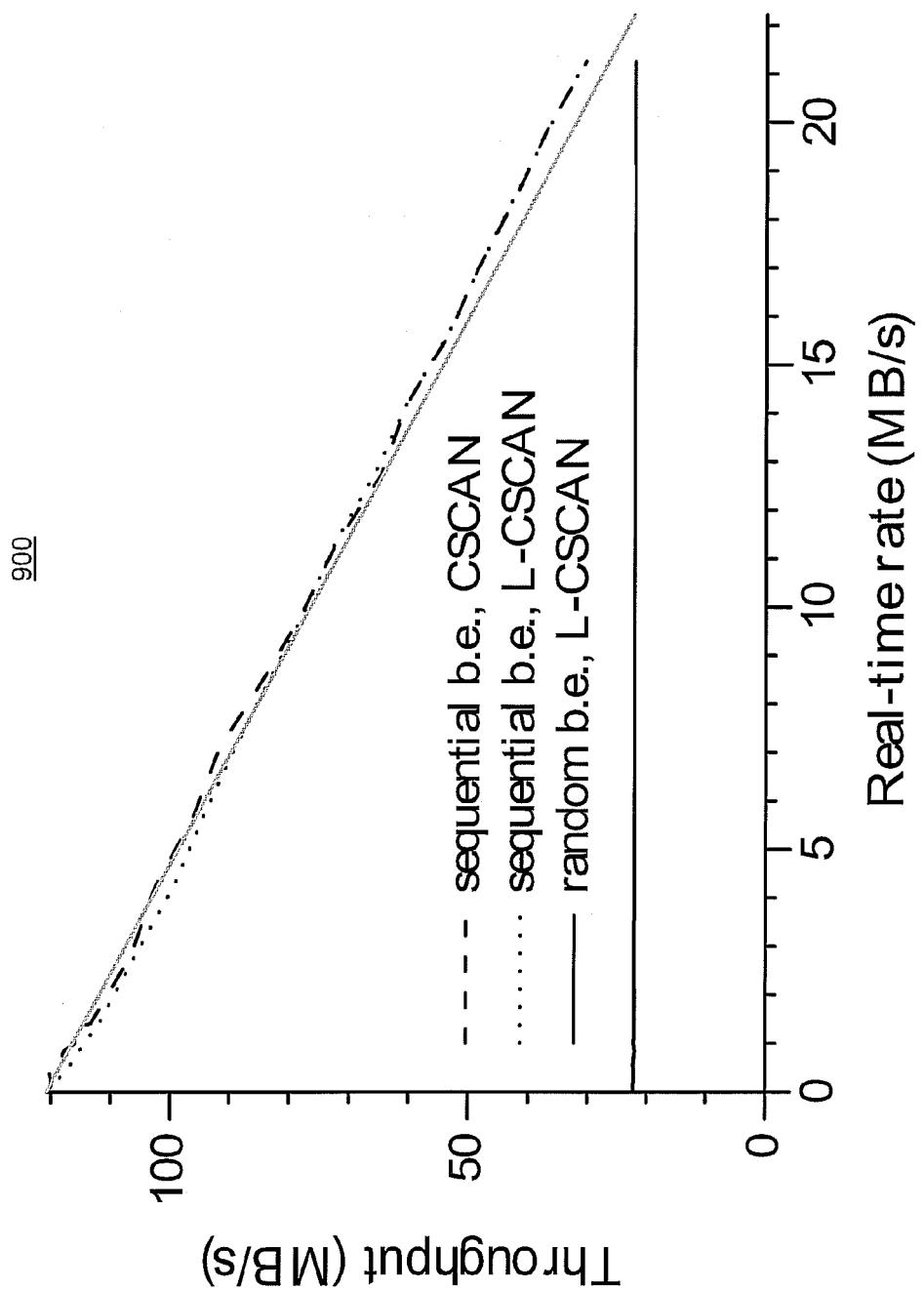
FIG. 9 is a graph demonstrating an improved throughput above 24 MB/s under equivalent conditions using the scheduling apparatus shown in FIG. 1, according to an example of the present disclosure.

FIG. 9 is a graph 900 which shows the throughput for two workloads as a function of real-time data-rate requirements when using a standard CSCAN queue. The first workload is a uniform random request pattern for both the real-time and best-effort requests, and the second workload is a uniform random request pattern for the real-time requests and a sequential pattern for the best-effort requests. The real-time request stream is smooth. Real-time requests have an initial slack time of thirty (30) seconds, and CSched is configured with zero (0) seconds allocated to SCAN-EDF and 1.4 seconds allocated to the device worst case, leaving 28.6 seconds maximal latency for L-SCAN.

One thing to note is that the performance for the uniform random workload is invariant to the real-time request load. The fact that this curve is flat with respect to real-time data rates, and that its value matches the near optimal value observed for this workflow (the right-most point of the dotted curve in FIG. 5), demonstrates that CSched obtains near optimal achievable performance for this workload on the device. As expected, as the real-time request rate increases, the total system throughput with the sequential best-effort request stream decreases, as the real-time requests absorb an increasing proportion of the available resource. However, the two curves, the dotted and the dashed curves, which represent the near optimal performance with and without real-time guarantees respectively, demonstrate that CSched also obtains nearly optimal throughput for the other high workload.

For comparison to any or all real-time disk scheduling MRISs that do not permit concurrent requests at the device, see FIG. 5, which shows curves demonstrating the relative performance for systems with a single outstanding request (i.e., curves 504 and 508) versus curves demonstrating the relative performance for systems with sixty concurrent requests (i.e., curves 502 and 506) in a variety of configurations. Since the workloads used 4 KB requests we can easily see from the leftmost data point on the bottom solid curve 508 in FIG. 5 that, on the same hardware configuration, EDF should expect to get less than 0.8 MB/s, while CSched gets about 22 MB/s. Similarly, the upper bound on any disk scheduling MRIS which does not accommodate concurrent requests is only about 1.4 MB/s, since that is the value of the right-most data point on curve 508 which represents a large efficient queue in front of the device.

Similar observations may be made regarding 1 MB request streams from the dashed curve. EDF would provide about 100 MB/s (the left-most point on that curve), while the most efficient real-time disk scheduler that did not permit concurrent requests could like reach about 140 MB/s (the right-most point on that curve). CSched typically reaches about 420 MB/s (the right-most point on the dot-dash curve) on the same hardware with the same request stream. As described above, the standard CSCAN scheduler's fairness is impaired as the request stream becomes more sequential and less random.

Figure 10:
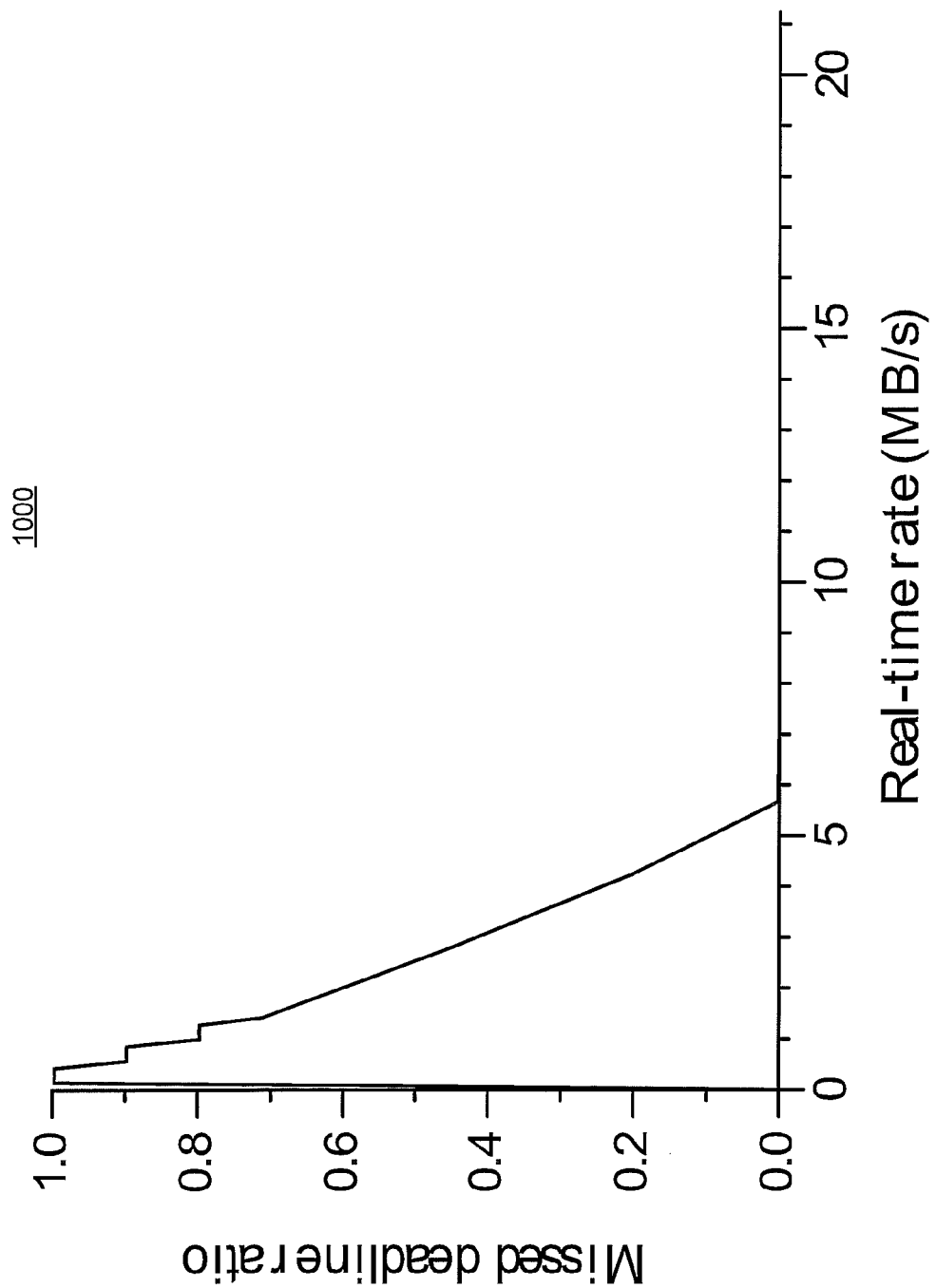
FIG. 10 is a graph demonstrating an improved missed deadline ratio for real-time requests as shown by this figure in which the L-CSCAN has a zero missed deadline ratio under equivalent conditions using the scheduling apparatus shown in FIG. 1, according to an example of the present disclosure.

FIG. 10 is a graph 1000 which is a demonstration of the need for the L-CSCAN queue, and shows the fraction of real-time requests that miss their deadlines when the best-effort request stream is sequential. When the real-time request rate is low, the best-effort requests may keep entering the CSCAN queue fast enough to cause each scan to spend an inordinate amount of time on the best-effort sequential requests, before it may proceed to service the real-time requests starving at other addresses.

Figure 11:
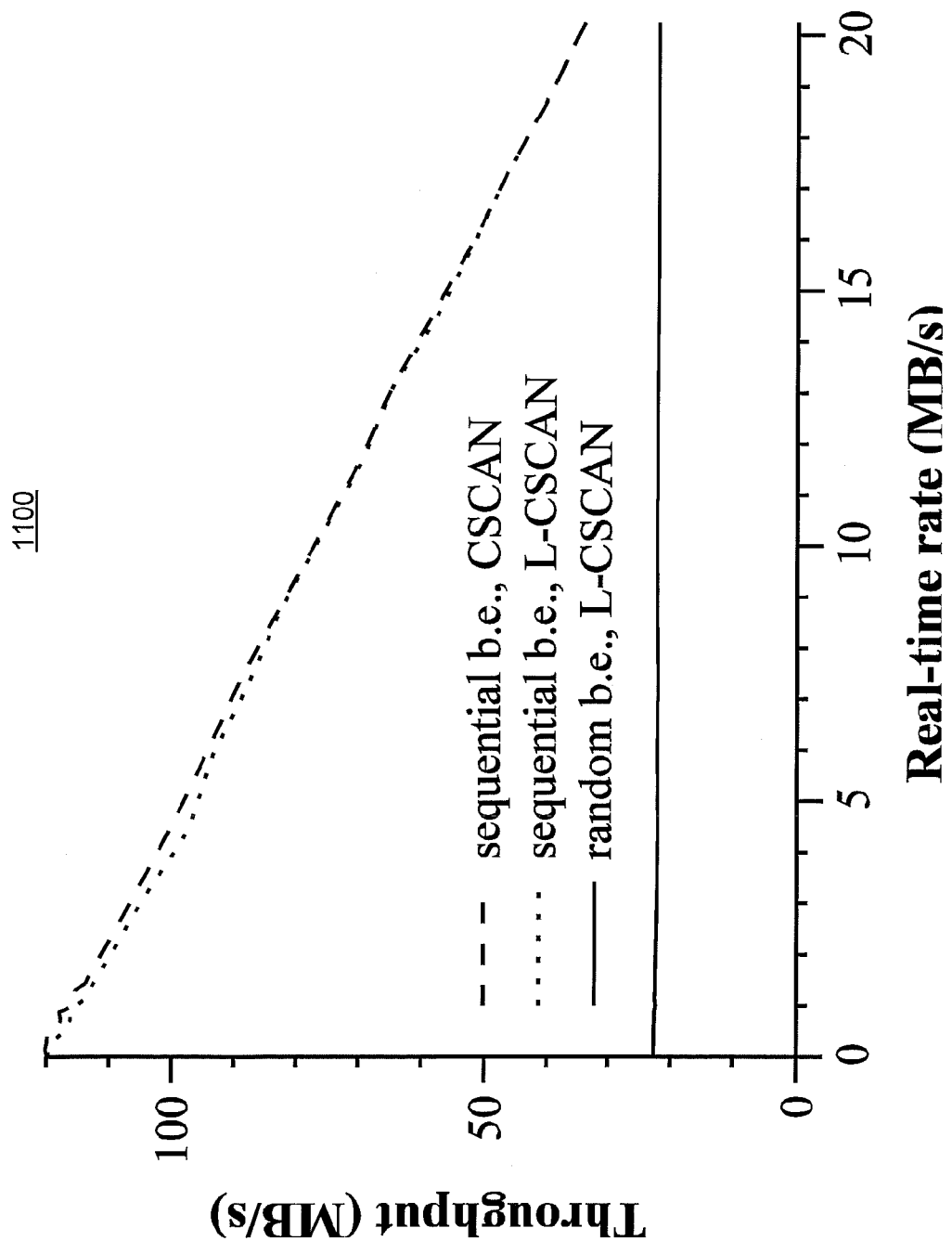
FIG. 11 is a graph demonstrating an improved throughput above 20 MB/s under equivalent conditions using the scheduling apparatus shown in FIG. 1, according to an example of the present disclosure.

FIG. 11 is a graph 1100 which is similar to FIG. 9, except that instead of having a smooth real-time request stream, it has a bursty request stream, with burst size of five seconds worth of real-time requests at a time. If the worst-case expected throughput rate time for 4 KB random real-time requests on the test hardware is 0.39 ms (expected=0.00039), and the desired real-time data rate is XMB/s, then number of requests in a given burst is sigma equivalent 5/0.00039 which is equivalent to 12, 820 requests or 53 MB of cache, and the burst inter-arrival rate for 4 KB requests is (4096·sigma)/(1, 000,000·X). If X=1 MB/s, then the burst inter-arrival rate is 52.5 seconds. The performance is similar to that shown in FIG. 9. So, performance is relatively invariant to burstiness in the real-time request stream, so long as the system is designed to handle bursts.

The above calculations are done using the worst-case throughput rate time data, which may be substantially different than the expected throughput rate time (see FIG. 7). The throughput of the system with the worst-case throughput rate time is about 10.5 MB/s, while the expected throughput of the system with thousands of queued requests is roughly 22 MB/s. As lambda decreases, a greater fraction of the initial slack time is to be allocated to the worst-case device service time, leaving less latency allocated to the L-CSCAN queue. This, in turn, implies that the size of the L-CSCAN queue is reduced, negatively impacting performance. If the real-time workloads are very bursty, i.e. sigma is large, then still further time is taken from the L-CSCAN queue. This may be addressed by a way to eliminate the SCAN-EDF queue by allowing real-time requests to preemptively remove the most recently added non-real-time requests from the LCSCAN queue and pushing them onto a holding stack. As soon as space opens up on the L-CSCAN queue, requests on the holding stack would be re-added to the L-CSCAN queue, thereby mostly preserving fairness among the non-real-time requests.

Another approach is if the minimum initial slack time value (lambda) is a dynamic parameter which may be re-determined in response to signals associated with expected future changes to the workload of different priority access requests. In this approach, re-determined minimum initial slack time value (lambda) is determined based on at least one value obtained from characterizing the memory device and the workload in response to signals associated with expected future changes to the workload of different priority access requests.

Figure 12:
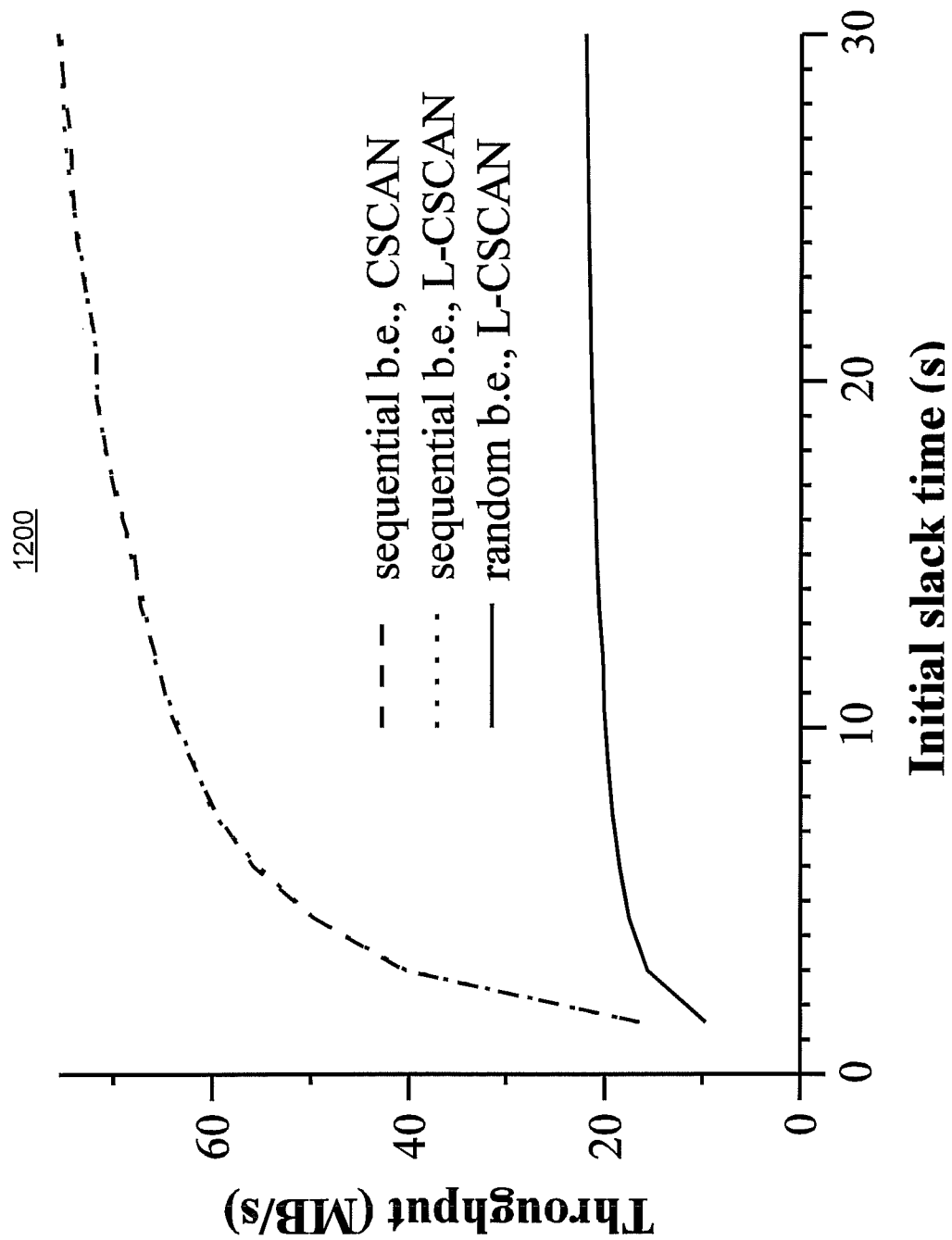
FIG. 12 is a graph demonstrating how throughput changes as a function of increasing minimum initial slack time value (lambda) using the scheduling apparatus shown in FIG. 1, according to an example of the present disclosure.

FIG. 12 is a graph 1200 which demonstrates how throughput changes as a function of increasing minimum initial slack time value (lambda) using the scheduling apparatus 100 shown in FIG. 1, according to an example. As shown in FIG. 12, throughput varies with lambda, with a constant real-time data rate of 9.5 MB/s, sigma=0 s, and delta=1.4 s. Since as lambda increases {1.5 . . . , 30} s, this also means that zeta increases {0.1, . . . , 28.6} s. Performance improves as zeta increases and consequently the L-CSCAN queue size increases, which agrees with the results shown in FIG. 4 above, namely that increasing the size of the scheduling queue improves the disk performance.

Figure 13:
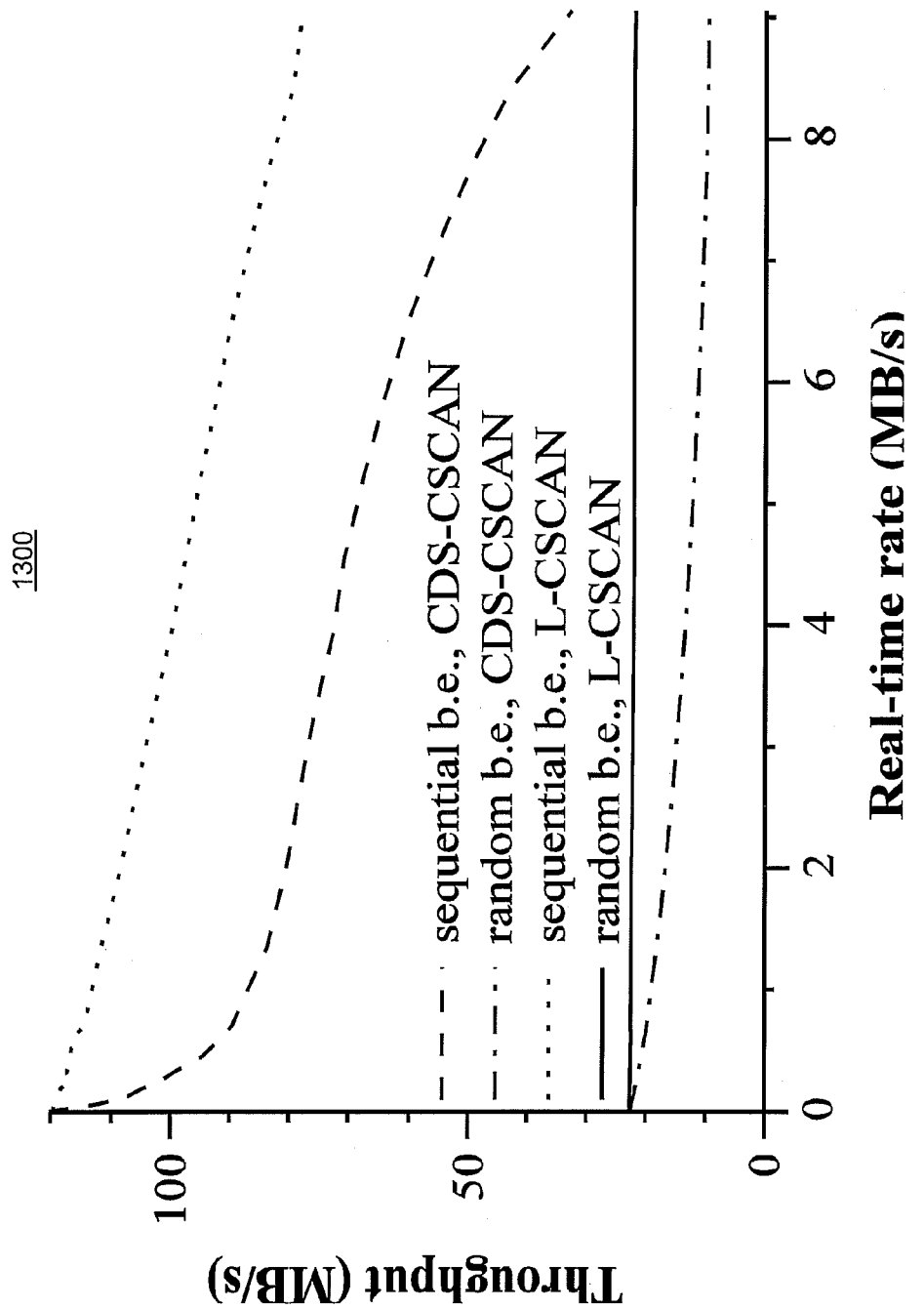
FIG. 13 is a graph demonstrating an improved throughput under random or sequential request conditions when scheduling real-time requests with best effort requests under equivalent conditions using the scheduling apparatus shown in FIG. 1, according to an example of the present disclosure.

FIG. 13 is a graph 1300 which demonstrates an improved throughput under random or sequential request conditions when scheduling real-time requests with best effort requests under equivalent conditions using the scheduling apparatus 100 shown in FIG. 1, according to an example. FIG. 13 is similar to FIG. 9, except that it also shows how the scheduler, CDS-SCAN, behaves. CDS-SCAN is further described in Staelin, et al., Real-time disk scheduling MRIS allowing concurrent I/O requests. Tech. Rep. HPL-2009-244, Hewlett-Packard Laboratories, October 2009, which is incorporated by reference herein, in its entirety. Note how CSched and CDS-SCAN's performance is similar when there are no real-time requests, but then, in comparison, CDS-SCAN's performance on the random best-effort request stream drops while CSched's performance remains constant. Also note how CDS-SCAN's performance for the sequential best-effort stream drops more precipitously than CSched's as the real-time rate increases.

7. CRS APPARATUS AND CRS METHODS

Disclosed herein are a method and apparatus for managing concurrent request scheduling (CRS). With reference first to FIG. 1, there is shown a simplified block diagram of a CRS system 100, according to an example. It is apparent to those of ordinary skill in the art that the diagram of FIG. 1 represents a generalized illustration and that other components may be added or existing components may be removed, modified or rearranged without departing from a scope of the CRS system 100.

The CRS system 100 is depicted as including a CRS apparatus 102, a processor 120, an input apparatus 130, an output interface 140, and a data store 118. The processor 120 is to implement and/or execute the CRS apparatus 102. Thus, for instance, the CRS system 100 may comprise a computing device and the CRS apparatus 102 may comprise an integrated and/or add-on hardware device of the computing device. As another example, the CRS apparatus 102 may comprise a computer readable storage device (not shown) upon which is stored a computer programs, which the processor 120 is to execute.

As further shown in FIG. 1, the processor 120 is to receive input from an input interface 130. The input interface 130 may comprise, for instance, a user interface through which a user may access data, such as, access requests, objects, MRISs, applications, etc., that are stored in the data store 118. In addition, or alternatively, a user may interface the input interface 130 to supply data into and/or update previously stored data in the data store 118. The input interface 130 may also comprise a user interface through which a user may access the a version of the data stored in the data store 118, as outputted through the output interface 140.

According to an example, the CRS apparatus 102 is to process access requests stored in a memory, such as, the data store 118. The access requests are in a workload of different priority access requests including access requests having a real-time priority, and lower priority requests, such as best-efforts requests and/or background requests. According to an example, the data store 118 may comprise non-volatile byte-addressable memory, such as, battery-backed random access memory (RAM), phase change RAM (PCRAM), Memristor, and the like. In addition, or alternatively, the data store 118 may comprise a device to read from and write to external removable media, such as a removable PCRAM device. Although the data store 118 has been depicted as being internal or attached to the data structure managing system 100, it should be understood that the data store 118 may be remotely located from the CRS system 100. In this example, the CRS system 100 may access the data store 118 through a network connection, the Internet, etc.

As further shown in FIG. 1, the CRS apparatus 102 includes a user interface module 104, a device characterization module 106, a workload characterization module 108, a CRS processing module 110, and an updating module 112. The modules 104-112 may comprise MRIS code modules, hardware modules, or a combination of MRISs and hardware modules. Thus, in one example, the modules 104-112 may comprise circuit components. In another example, the modules 104-112 may comprise code stored on a computer readable storage medium, which the processor 120 is to execute. As such, in one example, the CRS apparatus 102 comprises a hardware device, such as, a computer, a server, a circuit, etc. In another example, the CRS apparatus 102 comprises a computer readable storage medium upon which MRIS code for performing the functions of the modules 104-112 is stored. The various functions that the CRS apparatus 102 performs are discussed in greater detail below.

According to an example, the CRS apparatus 102 is to implement a CRS method. Various manners in which the modules 104-112 of the CRS apparatus 102 may be implemented are described in greater detail with respect to FIGS. 14 and 15, which depict flow diagrams of methods 1400 and 1500 to perform CRS. It is apparent to those of ordinary skill in the art that the methods 1400 and 1500 represent generalized illustrations and that other blocks may be added or existing blocks may be removed, modified or rearranged without departing from the scopes of the methods 1400 and 1500.

The descriptions of the methods 1400 and 1500 are made with particular reference to the CRS apparatus 102 depicted in FIG. 1 and the CRS architecture diagram 200 depicted in FIG. 2. It should, however, be understood that the methods 1400 and 1500 may be implemented in an apparatus that differs from the CRS apparatus 102 and the CRS architecture 200 without departing from the scopes of the methods 1400 and 1500.

Figure 14:
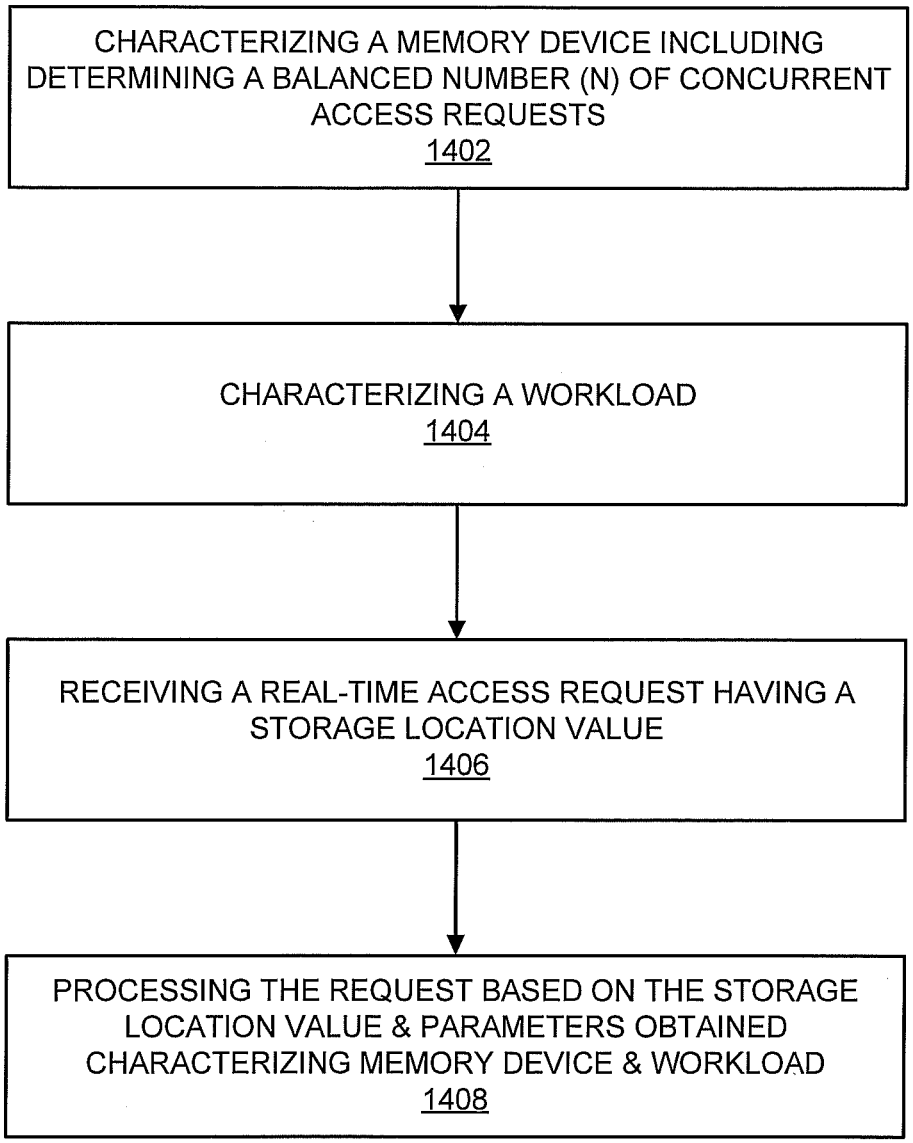
FIG. 14 is a flowchart illustrating a scheduling method, according to an example of the present disclosure.

With reference first to the method 1400 in FIG. 14, at block 1402, characterizing of the memory device is performed utilizing the device characterization module 106. In one example, the characterizing of the memory device includes determining a balanced number (N) of concurrent access requests. With reference to the method 1500 in FIG. 15, at block 1502, characterizing of the memory device includes determining a balanced number (N) of concurrent access requests, a worst case device service latency value (delta) and a maximum worst case throughput rate time (1/IOPS) values (tau). The values associated with tau are a function which may at least be associated with values for read/write, random/sequential and request size and, optionally, other values.

Block 1404 may be implemented in response to a workload of access requests which are associated with the memory device of block 1402. With reference first to the method 1400 in FIG. 14, characterizing of the workload is performed utilizing the workload characterization module 108. In one example, any workload characterization parameter may be characterized with respect to characterizing the workload. With reference to the method 1500 in FIG. 15, at block 1504, characterizing of the workload may include determining by a minimum initial slack time value (lambda) a burstiness value (sigma) and a worst case queue delay value (zeta). According to this example, zeta is not a characteristic of the workload, per se, but is a parameter derived with respect to the CRS architecture 200.

Block 1406, in FIG. 14, may be implemented in response to a signal or an indication that a real-time access request may be received having an access request storage location value. Block 1506, in FIG. 15, may also be implemented in response to a signal or an indication that a real-time access request may be received with an access request storage location value. Both blocks 1406 and 1506 may be implemented utilizing the CRS updating module 112.

Block 1408, in FIG. 14, may be implemented in response to receiving a real-time access request with an access request storage location value. Block 1508, in FIG. 15, may also be implemented in response to receiving a real-time access request with an access request storage location value. Blocks 1408 and 1508 include processing the real-time access request, based on the access request storage location value and the parameters obtained characterizing the memory device and the workload in the previous blocks. Both blocks 1408 and 1508 may be implemented utilizing the CRS processing module 110.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as MRIS program(s) comprised of program instructions in source code, object code, executable code or other formats. Any of the above may be embodied on a computer readable storage medium, which include storage devices.

An example of a computer readable storage media includes a conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

8. PLATFORMS FOR CRS METHOD, APPARATUS, COMPUTER READABLE MEDIUM

Turning now to FIG. 16, there is shown a computing device 1600, which may be employed as a platform for implementing or executing the methods depicted in FIGS. 14 and 15, or code associated with the methods. It is understood that the illustration of the computing device 1600 is a generalized illustration and that the computing device 1600 may include additional components and that some of the components described may be removed and/or modified without departing from a scope of the computing device 1600.

The device 1600 includes a processor 1602, such as a central processing unit; a display device 1604, such as a monitor; a network interface 1608, such as a Local Area Network (LAN), a wireless 802.11x LAN, a 3G mobile WAN or a WiMax WAN; and a computer-readable medium 510. Each of these components may be operatively coupled to a bus 1612. For example, the bus 1612 may be an EISA, a PCI, a USB, a FireWire, a NuBus, or a PDS.

The computer readable medium 1610 may be any suitable medium that participates in providing instructions to the processor 1602 for execution. For example, the computer readable medium 1610 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 1610 may also store other MRIS applications, including word processors, browsers, email, Instant Messaging, media players, and telephony MRIS.

The computer-readable medium 1610 may also store an operating system 1614, such as Mac OS, MS Windows, Unix, or Linux; network applications 1616; and a data structure managing application 1618. The operating system 1614 may be multi-user, multiprocessing, multitasking, multithreading, real-time and the like. The operating system 1614 may also perform basic tasks such as recognizing input from input devices, such as a keyboard or a keypad; sending output to the display 1604 and the design tool 1606; keeping track of files and directories on medium 1610; controlling peripheral devices, such as disk drives, printers, image capture device; and managing traffic on the bus 1612. The network applications 1616 includes various components for establishing and maintaining network connections, such as MRIS for implementing communication protocols including TCP/IP, HTTP, Ethernet, USB, and FireWire.

The data structure managing application 1618 provides various MRIS components for building/updating a CRS architecture, such as CRS architecture 200, for a non-volatile memory, as described above. In certain examples, some or all of the processes performed by the application 1618 may be integrated into the operating system 1614. In certain examples, the processes may be at least partially implemented in digital electronic circuitry, in computer hardware, firmware, MRIS, or in any combination thereof.

Although described specifically throughout the entirety of the instant disclosure, representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the examples. While the examples have been described with reference to examples, those skilled in the art are able to make various modifications to the described examples without departing from the scope of the examples as described in the following claims, and their equivalents.

What is claimed is:

1. A method of storage access scheduling for a memory device having a workload of different priority access requests including access requests having a real-time priority, the method comprising:

characterizing the memory device by at least one parameter associated with the memory device including
determining a balanced number of concurrent access requests associated with a concurrent access maximum throughput associated with the memory device;

characterizing the workload by at least one parameter associated with the workload;

receiving a real-time access request associated with an access request storage location value; and processing the real-time access request, utilizing a processor, based on the access request storage location value and the parameters characterizing the memory device and the workload.

2. The method of claim 1, wherein characterizing the memory device includes determining worst-case device service latency values based on the balanced number (N) of concurrent access requests.

3. The method of claim 2, wherein characterizing the workload includes at least one of
determining a minimum initial slack time value associated with a total worst-case service access time for the access requests in the workload having a real-time priority;
determining a burstiness value associated with the access requests in the workload having a real-time priority and
determining a worst-case queue delay value based on values obtained from characterizing the memory device and the workload.

4. The method of claim 3, wherein processing the real-time access request includes:
assigning the real-time access request to a pending queue holding only real-time access requests;
withdrawing the real-time access request from the pending queue holding only real-time access requests; and
assigning the real-time access request to a primary queue.

5. The method of claim 4, wherein the primary queue is associated with a parameter associated with the determined worst-case queue delay value.

6. The method of claim 5, wherein the primary queue accepts lower than real-time priority access requests assigned to it from at least one lower than real-time priority pending queue in addition to accepting requests from the pending queue holding only real-time access requests.

7. The method of claim 6, wherein processing the real-time access request includes
if a lower than real-time priority access request is assigned to the primary queue,
withdrawing the previously assigned lower than real-time priority access request from the primary queue in response to assigning the real-time access request to the primary queue.

8. The method of claim 4, wherein the pending queue holding only real-time access requests is associated with a parameter associated with the determined burstiness value.

9. The method of claim 8, wherein the determined minimum initial slack time value is associated with a lambda time budget allocated among a sigma time budget, a zeta time budget and a delta time budget, and
wherein the sigma time budget is associated with the determined burstiness value, the zeta time budget is associated with the determined worst-case queue delay value and the delta time budget is associated with the determined worst-case device service latency value.

10. The method of claim 4, wherein the primary queue is divided into a current queue and a next queue,
wherein both the current queue and the next queue receive different priority access requests,
wherein the received different priority access requests are assigned to the current queue and the next queue based on their respective access request storage location values, and
wherein the current queue is associated with a count to regulate swapping the current queue and the next queue and the count is modified when an access request is assigned to the current queue.

11. The method of claim 4, wherein the minimum initial slack time value is a dynamic parameter which is re-determined in response to signals associated with expected future changes to the workload of different priority access requests.

12. The method of claim 11, wherein the re-determined minimum initial slack time value is determined based on at least one value obtained from characterizing the memory device and the workload in response to signals associated with expected future changes to the workload of different priority access requests.

13. The method of claim 1, wherein characterizing the memory device includes determining maximum worst-case throughput rate time values associated with the concurrent access maximum throughput and
wherein determined values from characterizing the memory device and the workload are based on time.

14. An apparatus to perform storage access scheduling for a memory device having a workload of different priority access requests including access requests having a real-time priority, the apparatus comprising:
a processor to operate
a device characterization module to characterize the memory device by at least one parameter associated with the memory device including
determining a balanced number of concurrent access requests associated with a concurrent access maximum throughput associated with the memory device,
a workload characterization module to characterize the workload by at least one parameter associated with the workload, and
a concurrent request scheduling processing module to
receive a real-time access request associated with an access request storage location value, and
process the real-time access request based on the access request storage location value and parameters characterizing the memory device and the workload.

15. A non-transitory computer readable medium storing computer readable instructions including code to, that when executed by a computer system, perform storage access scheduling for a memory device having a workload of different priority access requests including access requests having a real-time priority, the computer readable instructions comprising code to:
characterize the memory device by at least one parameter associated with the memory device including
determining a minimum number of concurrent access requests associated with a concurrent access maximum throughput associated with the memory device;
characterize the workload by at least one parameter associated with the workload;
receive a real-time access request associated with an access request storage location value; and
process the real-time access request, utilizing a processor, based on the access request storage location value and parameters characterizing the memory device and the workload.

* * * * *

UNITED STATES PATENT AND TRADEMARK OFFICE
CERTIFICATE OF CORRECTION

| | | |
|---|---|---|
| PATENT NO. | : 9,026,748 B2 | Page 1 of 1 |
| APPLICATION NO. | : 13/977903 | |
| DATED | : May 5, 2015 | |
| INVENTOR(S) | : Carl Staelin et al. | |

It is certified that error appears in the above-identified patent and that said Letters Patent is hereby corrected as shown below:

In the Claims

In column 22, line 66, in Claim 1, after "and" delete "the", therefor.

In column 23, line 34 approx., in Claim 7, after "the" delete "previously", therefor.

In column 24, line 33 approx., in Claim 14, delete "scheduling processing" and insert -- scheduling (CRS) processing --, therefor.

Signed and Sealed this
Tenth Day of November, 2015

Michelle K. Lee
*Director of the United States Patent and Trademark Office*